(12) United States Patent
Rathay et al.

(10) Patent No.: US 10,570,750 B2
(45) Date of Patent: Feb. 25, 2020

(54) TURBINE COMPONENT WITH TIP RAIL COOLING PASSAGE

(71) Applicant: General Electric Company, Schenectady, NY (US)

(72) Inventors: Nicholas William Rathay, Rock City Falls, NY (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 15/833,431

(22) Filed: Dec. 6, 2017

(65) Prior Publication Data

US 2019/0169999 A1 Jun. 6, 2019

(51) Int. Cl.
*F01D 5/18* (2006.01)
*F01D 5/20* (2006.01)

(52) U.S. Cl.
CPC ............. *F01D 5/187* (2013.01); *F01D 5/20* (2013.01); *F05D 2220/32* (2013.01); *F05D 2240/307* (2013.01); *F05D 2250/141* (2013.01); *F05D 2260/202* (2013.01)

(58) Field of Classification Search
CPC ............. F01D 5/186; F01D 5/187; F01D 5/20
See application file for complete search history.

(56) References Cited

U.S. PATENT DOCUMENTS

| | | | |
|---|---|---|---|
| 6,461,107 B1 | 10/2002 | Lee et al. | |
| 6,932,571 B2 | 8/2005 | Cunha et al. | |
| 7,334,991 B2 | 2/2008 | Liang | |
| 7,632,062 B2 | 12/2009 | Harvey et al. | |
| 7,641,444 B1 | 1/2010 | Liang | |
| 7,901,183 B1 | 3/2011 | Liang | |
| 8,057,182 B2 * | 11/2011 | Brittingham | ............ F01D 5/186 415/115 |
| 8,079,811 B1 | 12/2011 | Liang | |
| 8,616,845 B1 | 12/2013 | Liang | |

(Continued)

FOREIGN PATENT DOCUMENTS

DE 19944923 B4 7/2007

OTHER PUBLICATIONS

U.S. Appl. No. 15/833,441, Notice of Allowance dated Jun. 20, 2019, 23 pages.

*Primary Examiner* — Nathaniel E Wiehe
*Assistant Examiner* — Michael K. Reitz
(74) *Attorney, Agent, or Firm* — Hoffman Warnick LLC

(57) ABSTRACT

A turbine component includes an airfoil having an airfoil chamber disposed within the airfoil, the airfoil chamber configured to supply a coolant through the airfoil. The tip of the airfoil includes a rail extending radially from the tip plate, the rail including an inner rail surface defining a tip pocket therein, an outer rail surface and a radially outward facing rail surface between the inner rail surface and the outer rail surface. A tip rail cavity is within and partially circumscribes the rail, the tip rail cavity receiving a coolant flow. A tip rail cooling passage includes an inlet fluidly coupled to the tip rail cavity, a passage length fluidly coupled to the inlet and partially circumscribing the rail, a metering element fluidly coupled to the passage length, and an outlet fluidly coupled to the metering element and extending through the radially outward facing rail surface.

20 Claims, 20 Drawing Sheets

(56) References Cited

U.S. PATENT DOCUMENTS

| | | |
|---|---|---|
| 8,753,083 B2 | 6/2014 | Lacy et al. |
| 8,764,379 B2 | 7/2014 | Pal |
| 9,188,012 B2 | 11/2015 | Lacy et al. |
| 9,216,491 B2 | 12/2015 | Bunker |
| 9,297,262 B2 | 3/2016 | Zhang et al. |
| 9,546,554 B2 | 1/2017 | Crites et al. |
| 9,816,389 B2 * | 11/2017 | Malak .................. F01D 5/187 |
| 2014/0178207 A1 | 6/2014 | He et al. |
| 2015/0078916 A1 * | 3/2015 | Bedrosyan ............... F01D 5/20 416/97 R |
| 2015/0159488 A1 | 6/2015 | Lehmann et al. |
| 2017/0002663 A1 * | 1/2017 | Quach ..................... F01D 5/20 |
| 2017/0175540 A1 | 6/2017 | Weber et al. |
| 2017/0175541 A1 | 6/2017 | Weber et al. |
| 2017/0175546 A1 | 6/2017 | Smith et al. |
| 2017/0175547 A1 | 6/2017 | Smith et al. |
| 2019/0017389 A1 | 1/2019 | Dyson et al. |
| 2019/0017391 A1 | 1/2019 | Dyson et al. |

* cited by examiner

TURBINE COMPONENT WITH TIP RAIL COOLING PASSAGE

CROSS-REFERENCE TO RELATED APPLICATIONS

This application is related to U.S application Ser. No. 15/833,441, filed concurrently and currently allowed.

BACKGROUND OF THE INVENTION

The disclosure relates generally to turbine components, and more particularly, to a turbine component including a tip rail cooling passage.

In a gas turbine engine, it is well known that air is pressurized in a compressor and used to combust a fuel in a combustor to generate a flow of hot combustion gases, whereupon such gases flow downstream through one or more turbines so that energy can be extracted therefrom. In accordance with such a turbine, generally, rows of circumferentially spaced turbine rotor blades extend radially outwardly from a supporting rotor disk. Each blade typically includes a dovetail that permits assembly and disassembly of the blade in a corresponding dovetail slot in the rotor disk, as well as an airfoil that extends radially outwardly from the dovetail.

The airfoil has a generally concave pressure side wall and generally convex suction side wall extending axially between corresponding leading and trailing edges and radially between a root and a tip. It will be understood that the blade tip is spaced closely to a radially outer turbine shroud for minimizing leakage therebetween of the combustion gases flowing downstream between the turbine blades. Maximum efficiency of the engine is obtained by minimizing the tip clearance or gap such that leakage is prevented, but this strategy is limited somewhat by the different thermal and mechanical expansion and contraction rates between the turbine rotor blades and the turbine shroud and the motivation to avoid an undesirable scenario of having excessive tip rub against the shroud during operation.

In addition, because turbine rotor blades are bathed in hot combustion gases, effective cooling is required for ensuring a useful part life. Typically, the blade airfoils are hollow and disposed in fluid communication with the compressor so that a portion of pressurized air bled therefrom is received for use in cooling the airfoils, as a coolant. Airfoil cooling is quite sophisticated and may be employed using various forms of internal cooling channels and features, as well as cooling holes through the outer walls of the airfoil for discharging the cooling air. Nevertheless, airfoil tips are particularly difficult to cool since they are located directly adjacent to the turbine shroud and are heated by the hot combustion gases that flow through the tip gap. Accordingly, a portion of the air channeled inside the airfoil of the blade is typically discharged through the tip for the cooling thereof.

It will be appreciated that conventional blade tips include several different geometries and configurations that are meant to prevent leakage and increase cooling effectiveness. Conventional blade tips, however, all have certain shortcomings, including a general failure to adequately reduce leakage and/or allow for efficient tip cooling that minimizes the use of efficiency-robbing compressor bypass air. One approach, referred to as a "squealer tip" arrangement, provides a radially extending rail that may rub against the tip shroud. The rail reduces leakage and therefore increases the efficiency of turbine engines.

However, the rail of the squealer tip is subjected to a high heat load and is difficult to effectively cool—it is frequently one of the hottest regions in the blade. Tip rail impingement cooling delivers coolant through the top of the rail, and has been demonstrated to be an effective method of rail cooling. However, there are numerous challenges associated with exhausting a coolant through the top of the rail. For example, backflow pressure margin requirements are difficult to satisfy with this arrangement (especially on the pressure side wall, where there are holes connected to low and high pressure regions—the top and pressure side walls of the rail, respectively). Hence, it is a challenge to create losses in the tip passage to back-pressure the coolant flow, and at the same time, sufficiently cool the rail, since losses reduce the amount of cooling fluid used in this region. Further, the outlet holes must exhibit rub tolerance yet provide sufficient cooling to the rails. For example, the outlet holes must be tolerant of tip rub but also sufficiently large that dust cannot clog them.

Ideally, the rail cooling passages are also capable of formation using additive manufacturing, which presents further challenges. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. With regard to tip rail cooling passages, conventional circular cooling holes within the rail are very difficult to build using additive manufacturing (perpendicular to the nominal build direction) and severely deform or collapse during manufacture.

Another challenge with tip cooling is accommodating the different temperatures observed in different areas of the tip rail. For example, the rail in the pressure side wall and aft region of the suction side wall are typically hotter than other areas.

BRIEF DESCRIPTION OF THE INVENTION

A first aspect of the disclosure provides a turbine component, including: an airfoil having: a base, a tip disposed opposite the base, and a pressure sidewall and a suction sidewall extending between a leading edge and a trailing edge thereof; an airfoil chamber disposed within the airfoil, the airfoil chamber configured to supply a coolant through the airfoil; a tip plate at the tip and a rail extending radially from the tip plate, the rail disposed near or at a periphery of the tip plate, the rail including an inner rail surface, an outer rail surface and a radially outward facing rail surface between the inner rail surface and the outer rail surface; a cavity within and partially circumscribing the rail, the cavity receiving a coolant flow; and a tip rail cooling passage including an inlet fluidly coupled to the cavity, a passage length fluidly coupled to the inlet and partially circumscribing the rail, a metering element fluidly coupled to the passage length, and an outlet fluidly coupled to the metering element and extending through the radially outward facing rail surface.

A second aspect of the disclosure provides a turbine rotor blade for a gas turbine engine, the turbine rotor blade including: an airfoil having: a base, a tip disposed opposite the base, and a pressure sidewall and a suction sidewall extending between a leading edge and a trailing edge thereof; an airfoil chamber disposed within the airfoil, the airfoil chamber configured to supply a coolant through the airfoil; a tip plate at the tip and a rail extending radially from the tip plate, the rail disposed near or at a periphery of the tip plate, the rail including an inner rail surface, an outer rail surface and a radially outward facing rail surface between the inner rail surface and the outer rail surface; a cavity within and partially circumscribing the rail, the cavity receiving a coolant flow; and a tip rail cooling passage including an inlet fluidly coupled to the cavity, a passage length fluidly coupled to the inlet and partially circumscribing the rail, a metering element fluidly coupled to the passage length, and an outlet fluidly coupled to the metering element and extending through the radially outward facing rail surface.

A third aspect provides a turbine component, including: an airfoil having: a base, a tip disposed opposite the base, and a pressure side wall and a suction side wall extending between a leading edge and a trailing edge thereof; an airfoil chamber disposed within the airfoil, the airfoil chamber configured to supply a coolant through the airfoil; a tip plate at the tip between the pressure side wall and the suction side wall; a rail extending radially from the tip plate, the rail disposed near or at a periphery of the tip plate, the rail including at least one tip rail cooling structure at least partially therein; a rail coolant directing chamber radially positioned between the airfoil chamber and the tip plate within the airfoil, the rail coolant directing chamber including an inlet fluidly coupled to the airfoil chamber to receive a coolant flow including at least a portion of the coolant from the airfoil chamber; a plurality of outlets from the rail coolant directing chamber directing the coolant flow to the at least one tip rail cooling structure of the rail; and at least one directing wall within the rail coolant directing chamber, the at least one directing wall positioned to direct the coolant flow towards one or more of the plurality of outlets located along at least one of the pressure side wall and an aft region of the suction side wall prior to other outlets.

A fourth aspect relates to a turbine rotor blade for a gas turbine engine, the turbine rotor blade including: an airfoil having a base, a tip disposed opposite the base, and a pressure side wall and a suction side wall extending between a leading edge and a trailing edge thereof; an airfoil chamber disposed within the airfoil, the airfoil chamber configured to supply a coolant through the airfoil; a tip plate at the tip between the pressure side wall and the suction side wall; a rail extending radially from the tip plate, the rail disposed near or at a periphery of the tip plate, the rail including at least one tip rail cooling structure at least partially therein; a rail coolant directing chamber radially positioned between the airfoil chamber and the tip plate within the airfoil, the rail coolant directing chamber including an inlet fluidly coupled to the airfoil chamber to receive a coolant flow including at least a portion of the coolant from the airfoil chamber; a plurality of outlets from the rail coolant directing chamber directing the coolant flow to the at least one tip rail cooling structure of the rail; and at least one directing wall within the rail coolant directing chamber, the at least one directing wall positioned to direct the coolant flow towards one or more of the plurality of outlets located along at least one of the pressure side wall and an aft region of the suction side wall prior to other outlets.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
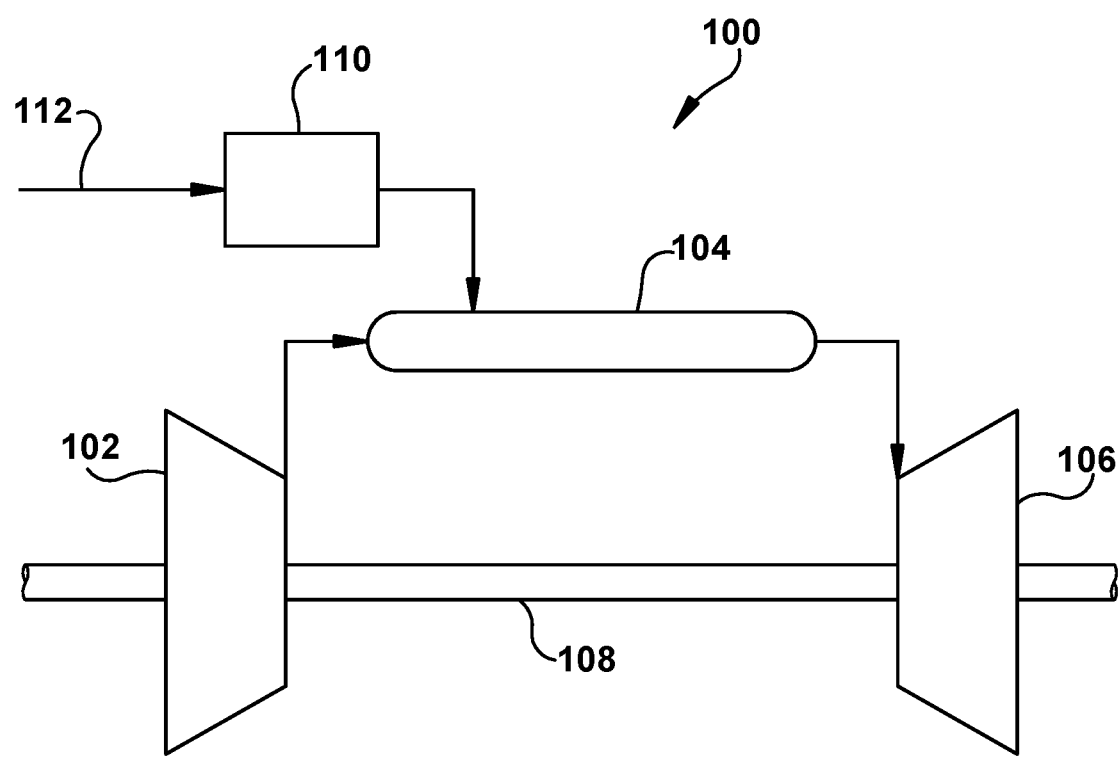
FIG. 1 is a schematic diagram of an embodiment of a turbomachine system.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a turbomachine system and relative to a turbine component. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a working fluid, such as combustion gases through the turbine engine or, for example, the flow of air through the combustor or coolant through or by one of the turbine's components. The term "downstream" corresponds to the direction of flow of the fluid, and the term "upstream" refers to the direction opposite to the flow. The terms "forward" and "aft," without any further specificity, refer to directions, with "forward" referring to an upstream portion of the part being referenced, i.e., closest to compressor, and "aft" referring to a downstream portion of the part being referenced, i.e., farthest from compressor. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, embodiments of the disclosure provide a turbine component or turbine rotor blade including a variety of a rail cooling passage and/or a rail coolant directing chamber. The turbine component includes an airfoil having an airfoil chamber disposed within the airfoil, the airfoil chamber configured to supply a coolant through the airfoil. The tip of the airfoil includes a tip plate at the tip defining an outwardly facing tip end between the pressure side wall and the suction side wall. A rail may extend radially from the tip plate. The rail may include an inner rail surface defining a tip rail pocket therein, an outer rail surface and a radially outward facing rail surface between the inner rail surface and the outer rail surface.

In embodiments, a "rail cooling structure" may include a tip rail coolant passage with a tip rail cavity or just a tip rail cavity, each of which may be positioned within and partially circumscribe the rail. The tip rail cavity receives a coolant flow, e.g., from the airfoil chamber or the rail coolant directing chamber. A tip rail cooling passage may include an inlet fluidly coupled to the tip rail cavity, a passage length fluidly coupled to the inlet and partially circumscribing the rail, a metering element fluidly coupled to the passage length, and an outlet fluidly coupled to the metering element and extended through the radially outward facing rail surface. The tip rail cooling passage allows for improved cooling of the rail while metering coolant therethrough.

In embodiments, a rail coolant directing chamber may be positioned radially outward from the airfoil chamber and radially inward from the tip plate. The rail coolant directing chamber may include an inlet fluidly coupled to the airfoil chamber to receive a coolant flow including at least a portion of the coolant from the airfoil chamber. A plurality of outlets from the rail coolant directing chamber direct the coolant flow to the at least one rail cooling structure in the rail, e.g., a tip rail cavity and then a tip rail cooling passage, or just a tip rail cavity. Directing wall(s) within the rail coolant directing chamber are positioned to direct the coolant flow towards one or more of the plurality of outlets located along at least one of the pressure side wall and an aft region of the suction side wall prior to other outlets. Rail coolant directing chamber delivers cooler coolant flow to those areas of the tip and/or rail, e.g., the suction side, aft portion thereof, requiring additional cooling compared to other parts of the tip.

The tip rail cooling structure and/or rail coolant directing chamber allow for additive manufacturing. The tip rail cooling passage also addresses dust clogging. Additive manufacturing (AM) includes a wide variety of processes of producing a component through the successive layering of material rather than the removal of material. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component. In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two-dimensional slice of the component geometry can be fused by selectively melting the metal powder. The melting may be performed by a high-powered melting beam, such as a 100 Watt ytterbium laser, to fully weld (melt) the metal powder to form a solid metal. The melting beam moves in the X-Y direction using scanning mirrors, and has an intensity sufficient to fully weld (melt) the metal powder to form a solid metal. The metal powder bed may be lowered for each subsequent two-dimensional layer, and the process repeats until the component is completely formed.

FIG. 1 is a schematic diagram of an embodiment of a turbomachine system, such as a gas turbine system 100. System 100 includes a compressor 102, a combustor 104, a turbine 106, a shaft 108 and a fuel nozzle 110. In an embodiment, system 100 may include a plurality of compressors 102, combustors 104, turbines 106, shafts 108 and fuel nozzles 110. Compressor 102 and turbine 106 are coupled by shaft 108. Shaft 108 may be a single shaft or a plurality of shaft segments coupled together to form shaft 108.

In one aspect, combustor 104 uses liquid and/or gas fuel, such as natural gas or a hydrogen rich synthetic gas, to run the engine. For example, fuel nozzles 110 are in fluid communication with an air supply and a fuel supply 112. Fuel nozzles 110 create an air-fuel mixture, and discharge the air-fuel mixture into combustor 104, thereby causing a combustion that creates a hot pressurized exhaust gas. Combustor 104 directs the hot pressurized gas through a transition piece into a turbine nozzle (or "stage one nozzle"), and other stages of buckets and nozzles causing turbine 106 rotation. The rotation of turbine 106 causes shaft 108 to rotate, thereby compressing the air as it flows into compressor 102. In an embodiment, hot gas path components, including, but not limited to, shrouds, diaphragms, nozzles, blades and transition pieces are located in turbine 106, where hot gas flow across the components causes creep, oxidation, wear and thermal fatigue of turbine parts. Controlling the temperature of the hot gas path components can reduce distress modes in the components. The efficiency of the gas turbine increases with an increase in firing temperature in turbine system 100. As the firing temperature increases, the hot gas path components need to be properly cooled to meet service life. Components with improved arrangements for cooling of regions proximate to the hot gas path and methods for making such components are discussed in detail herein. Although the following discussion primarily focuses on gas turbines, the concepts discussed are not limited to gas turbines.

Figure 2:
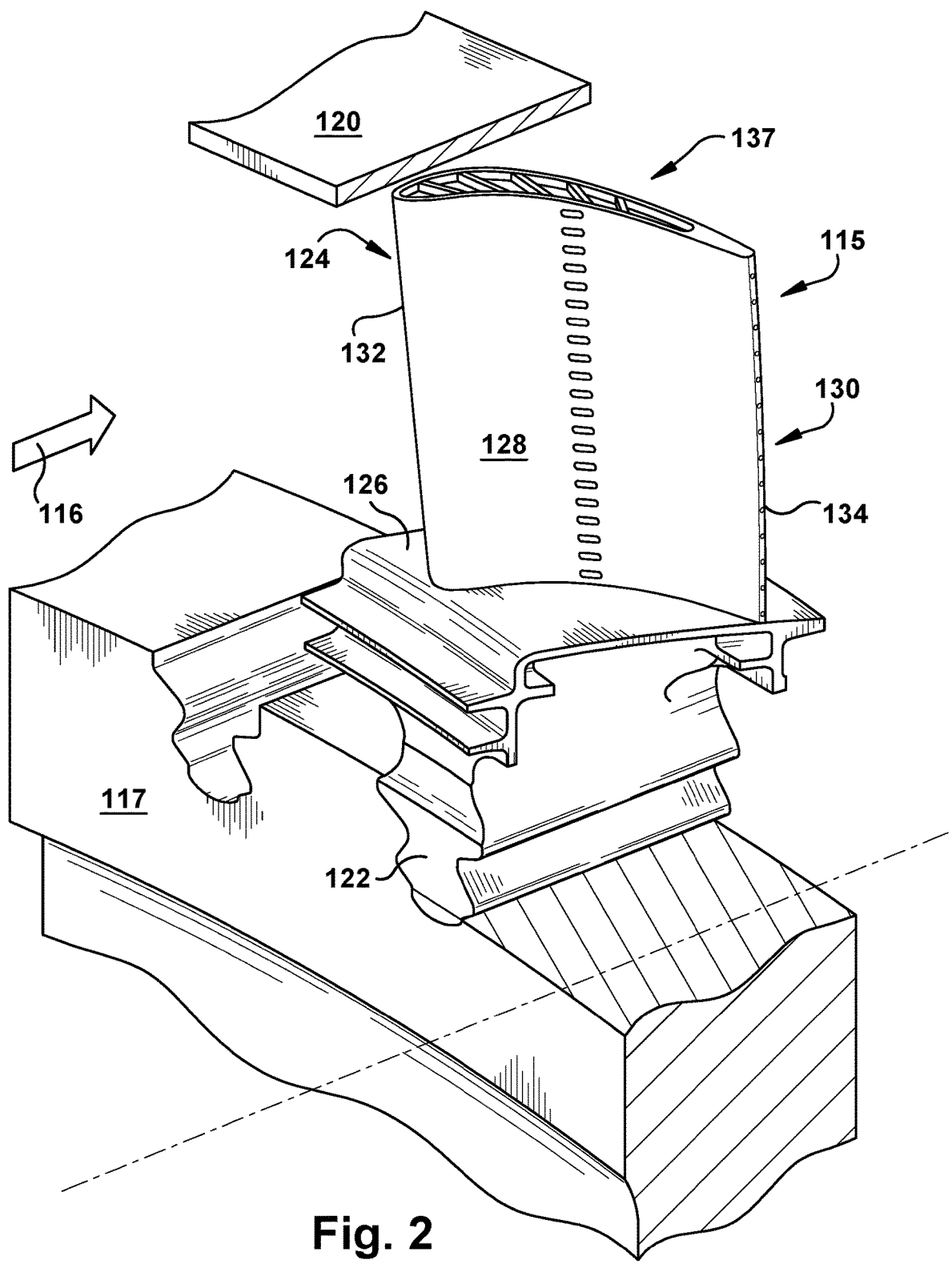
FIG. 2 is a perspective view of an illustrative turbine component in the form of a turbine rotor blade assembly including a rotor disk, a turbine blade, and a stationary shroud.

FIG. 2 is a perspective view of an illustrative conventional turbine component, a turbine rotor blade 115 which is positioned in a turbine of a gas turbine or combustion engine. It will be appreciated that the turbine is mounted downstream from a combustor for receiving hot combustion gases 116 therefrom. The turbine, which is axisymmetric about an axial centerline axis, includes a rotor disk 117 and a plurality of circumferentially spaced apart turbine rotor blades (only one of which is shown) extending radially outwardly from the rotor disk 117 along a radial axis. An annular, stationary turbine shroud 120 is suitably joined to a stationary stator casing (not shown) and surrounds turbine rotor blades 115 such that a relatively small clearance or gap remains therebetween that limits leakage of combustion gases during operation.

Each turbine rotor blade 115 generally includes a base 122 (also referred to as root or dovetail) which may have any conventional form, such as an axial dovetail configured for being mounted in a corresponding dovetail slot in the perimeter of the rotor disk 117. A hollow airfoil 124 is integrally joined to base 122 and extends radially or longitudinally outwardly therefrom. Turbine rotor blade 115 also includes an integral platform 126 disposed at the junction of airfoil 124 and base 122 for defining a portion of the radially inner flow path for combustion gases 116. It will be appreciated that turbine rotor blade 115 may be formed in any conventional manner, and is typically a one-piece casting, an additively manufactured part, or an additively manufacturing tip joined to a cast blade base section. It will be seen that airfoil 124 preferably includes a generally concave pressure side wall 128 and a circumferentially or laterally opposite, generally convex suction side wall 130 extending axially between opposite leading and trailing edges 132 and 134, respectively. Side walls 128 and 130 also extend in the radial direction from platform 126 to a radially outer blade tip or, simply, tip 137.

Figure 3:
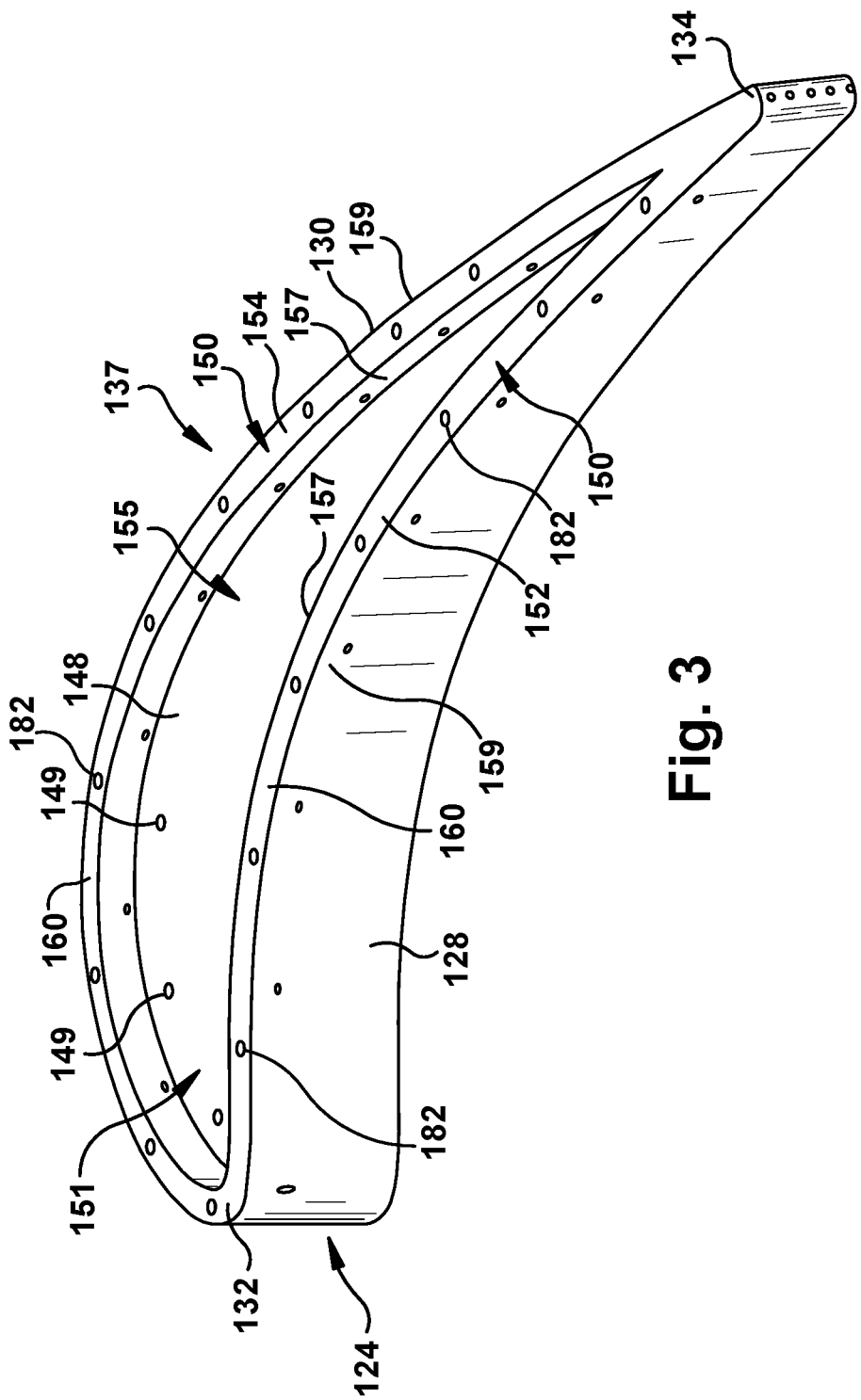
FIG. 3 is a close-up, solid perspective view of the tip of a turbine component in the form of a turbine rotor blade in which embodiments of the disclosure may be used.

FIG. 3 provides a close-up, perspective view of an illustrative turbine blade tip 137 on which embodiments of the present disclosure may be employed. In general, blade tip 137 is disposed opposite base 122 (FIG. 2) and includes a tip plate 148 defining an outwardly facing tip end 151 between pressure side wall 128 and suction side wall 130. Tip plate 148 typically bounds internal cooling passages (which will be simply referenced herein as an "airfoil chamber" 174 (FIG. 4, see also FIG. 9)) disposed within airfoil 124, and are defined between pressure side wall 128 and suction side wall 130 of airfoil 124. The airfoil chamber is configured to supply a coolant through airfoil 124, e.g., in a radial direction. That is, coolant, such as compressed air bled from the compressor, may be circulated through the airfoil chamber during operation. The airfoil chamber may include any now known or later developed coolant carrying passages or circuits including but not limited to: cooling passages (see FIGS. 9 and 19), impingement sleeves or elements, connecting passages, cavities, pedestals, etc. Tip plate 148 may be integral to turbine rotor blade 115, or it may be welded/brazed into place after the blade is cast.

Due to certain performance advantages, such as reduced leakage flow, blade tips 137 frequently include a tip rail, or simply, rail 150. Coinciding with pressure side wall 128 and suction side wall 130, rail 150 may be described as including a pressure side wall rail 152 and a suction side wall rail 154, respectively. Generally, pressure side wall rail 152 extends radially outwardly from tip plate 148 and extends from leading edge 132 to trailing edge 134 of airfoil 124. As illustrated, the path of pressure side wall rail 152 is adjacent to or near the outer radial edge of pressure side wall 128 (i.e., at or near the periphery of tip plate 148 such that it aligns with the outer radial edge of the pressure side wall 128). Similarly, as illustrated, suction side wall rail 154 extends radially outwardly from tip plate 148 and extends from leading edge 132 to trailing edge 134 of airfoil 124. The path of suction side wall rail 154 is adjacent to or near the outer radial edge of suction side wall 130 (i.e., at or near the periphery of the tip plate 148 such that it aligns with the outer radial edge of the suction side wall 130). Both pressure side wall rail 152 and suction side wall rail 154 may be described as having an inner rail surface 157, an outer rail surface 159 and a radially outward facing rail surface 160 between inner rail surface 157 and outer rail surface 159. It should be understood though that rail(s) may not necessarily follow the pressure or suction side wall rails. That is, in alternative types of tips in which the present disclosure may be used, tip rails 150 may be moved away from the edges of tip plate 148 and may not extend to trailing edge 134.

Formed in this manner, it will be appreciated that tip rail 150 defines a tip pocket 155 at tip 137 of turbine rotor blade 115. As one of ordinary skill in the art will appreciate, a tip 137 configured in this manner, i.e., one having this type of tip pocket 155, is often referred to as a "squealer tip" or a tip having a "squealer pocket or cavity." The height and width of pressure side wall rail 152 and/or suction side wall rail 154 (and thus the depth of tip pocket 155) may be varied depending on best performance and the size of the overall turbine assembly. It will be appreciated that tip plate 148 forms the floor of tip pocket 155 (i.e., the inner radial boundary of the cavity), tip rail 150 forms the side walls of tip pocket 155, and tip pocket 155 remains open through an outer radial face, which, once installed within a turbine engine, is bordered closely by annular, stationary turbine shroud 120 (see FIG. 2) that is slightly radially offset therefrom. Radially outward facing rail surface 160 of rail 150 may rub against annular, stationary turbine shroud 120.

Figure 4:
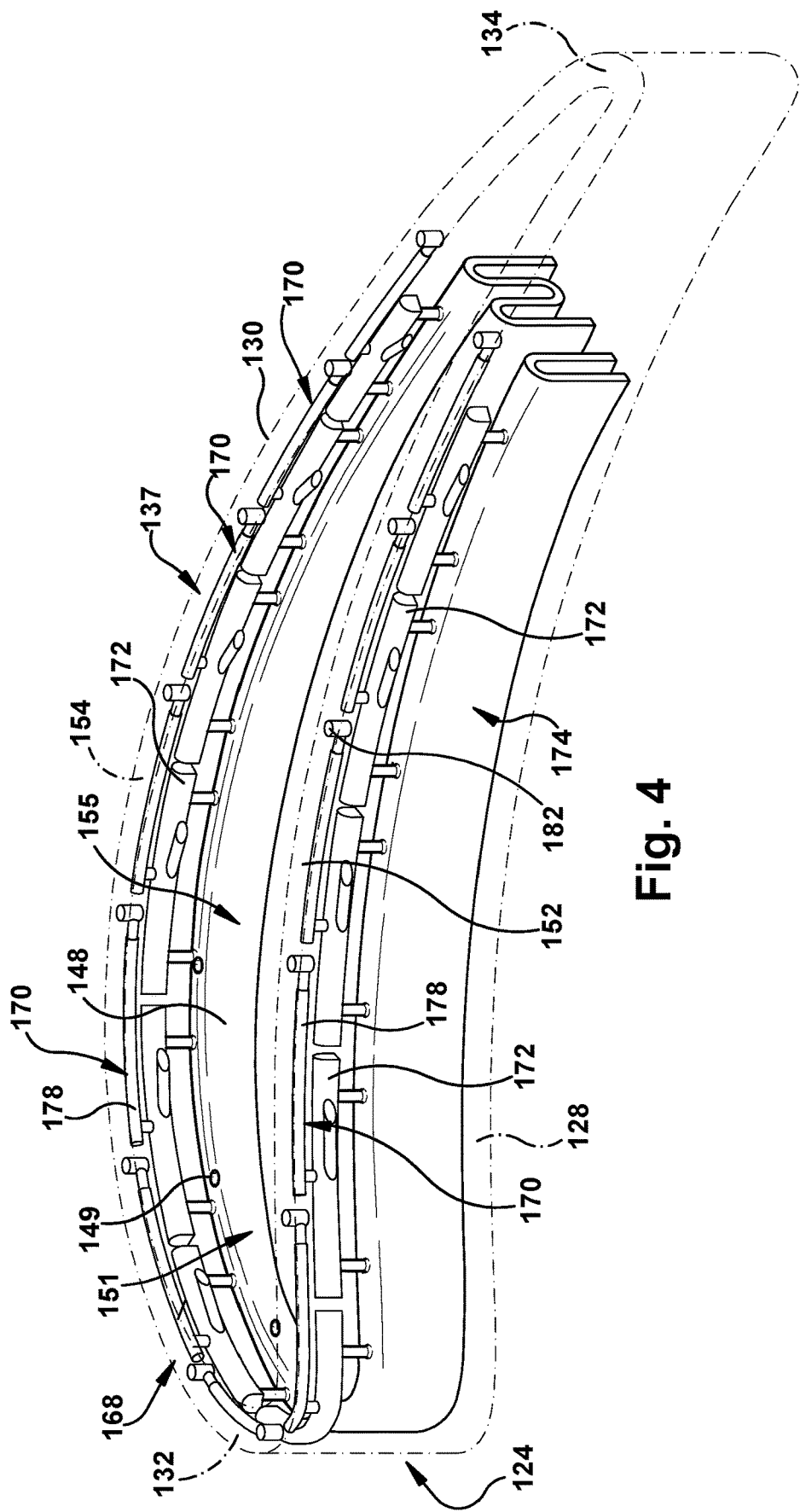
FIG. 4 shows a see-through perspective view of the tip of a turbine component in the form of a turbine rotor blade in which embodiments of the disclosure may be used.
Figure 5:
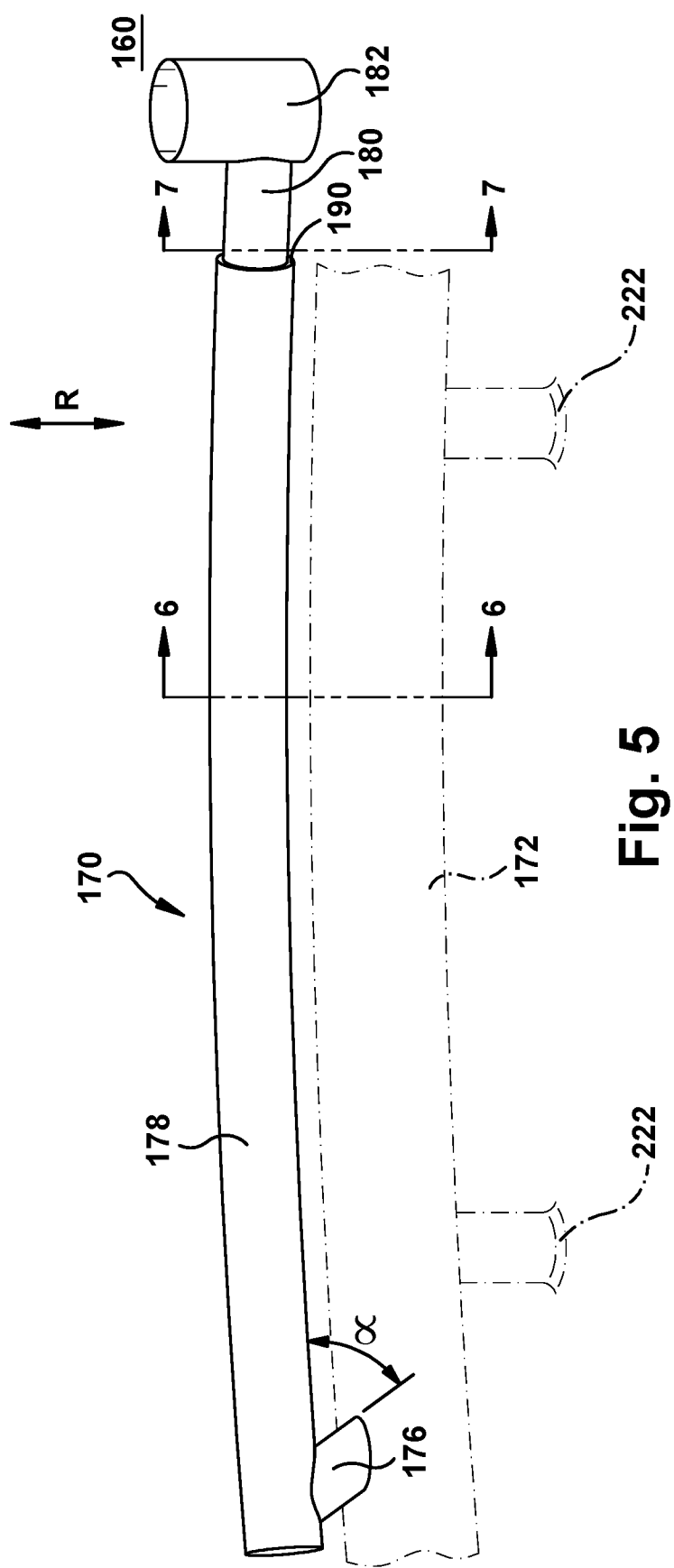
FIG. 5 shows a perspective view of an illustrative shape of a tip rail cooling passage (i.e., air space) according to embodiments of the disclosure.

Referring to FIGS. 4-7, embodiments of a tip rail cooling structure 168 (FIG. 4) in the form of a tip rail cooling passage 170 will now be described. FIG. 4 shows a see-through perspective view of tip 137 of the turbine component in the form of turbine rotor blade 115 in which embodiments of tip rail cooling passage 170 may be used, and FIG. 5 shows a perspective view of an illustrative shape of tip rail cooling passage 170 (i.e., air space) according to embodiments of the disclosure. As shown in FIG. 4, a tip rail cavity 172 is positioned at least partially (radially) within and partially circumscribes rail 150. Tip rail cavity 172 can include any form of opening in rail 150 receiving a coolant flow. Tip rail cavity 172 can receive a coolant flow from or as part of airfoil chamber 174 (FIG. 4), or from a rail coolant directing chamber 200 (e.g., FIGS. 8, 9 and 18), the latter of which is described in greater detail herein. In one example, shown in FIG. 4, tip rail cavity 172 receives coolant flow after impingement cooling of interior surfaces of pressure and suction side walls 128, 130, i.e., it is a post-impingement cavity, via a plurality of outlets 222 from airfoil chamber 174. Tip rail cavity 172 may extend any length to pass within rail 150, i.e., circumscribe the curvature of rail 150. Tip rail cavity 172 may include any number of openings therein for receiving the coolant flow from airfoil chamber 174 or rail coolant directing chamber 220 (described herein). Tip rail cavity 172 can have any cross-sectional shape desired.

In accordance with embodiments of the disclosure, tip rail cooling passage 170 fluidly couples to tip rail cavity 172. As shown best in FIG. 5, tip rail cooling passage 170 according to embodiments of the disclosure may include an inlet 176 fluidly coupled to tip rail cavity 172, a passage length 178 fluidly coupled to inlet 176 and partially circumscribing rail 150, a metering element 180 fluidly coupled to passage length 178, and an outlet 182 fluidly coupled to metering element 180 and extending through radially outward facing rail surface 160 (FIG. 4). Inlet 176 may be fluidly coupled to tip rail cavity 172 in any manner and at any location along tip rail cavity 172 such that coolant flow within tip rail cavity 172 passes into inlet 176. In one embodiment, inlet 176 may be angled to direct coolant flow in a direction opposite that of passage length 178. In one embodiment, inlet 176 may be disposed at an angle a ranging from 20-90° relative to passage length 178. As coolant flow passes through and by angled inlet 176, coolant flow separates off the angled edges, creating a pressure loss in the coolant and a region of high heat transfer (compared to other flow areas).

As shown in FIG. 4, passage length 178 runs parallel to a portion of radially outward facing rail surface 160. Consequently, tip rail cooling passage 170 can cool a length of rail 150, while also venting coolant out of radially outward facing rail surface 160. Passage length 178 can have any length desired.

Figure 7:
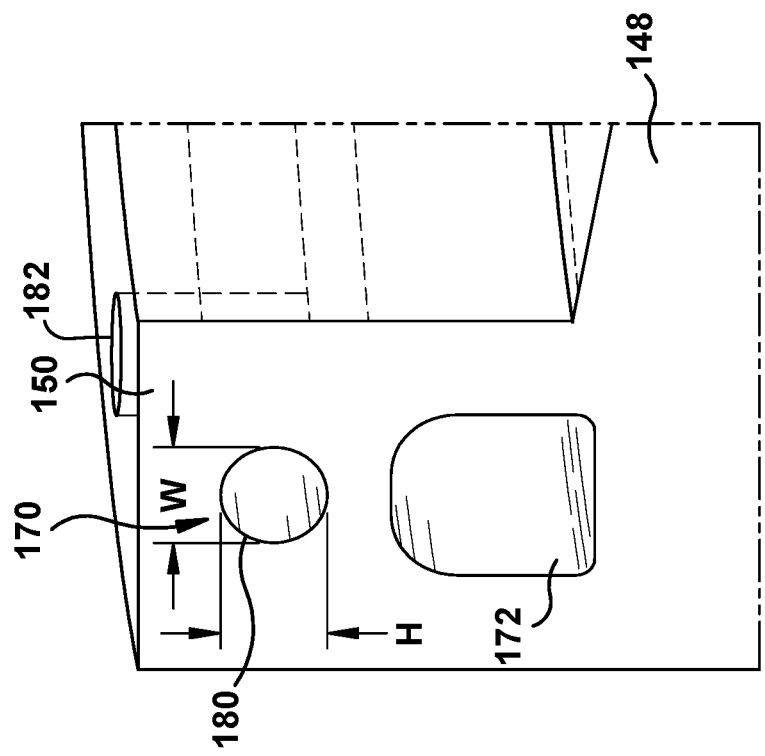
FIG. 7 shows a cross-sectional view of a tip rail along line 7-7 in FIG. 5, showing a cross-section of a metering element.
Figure 6:
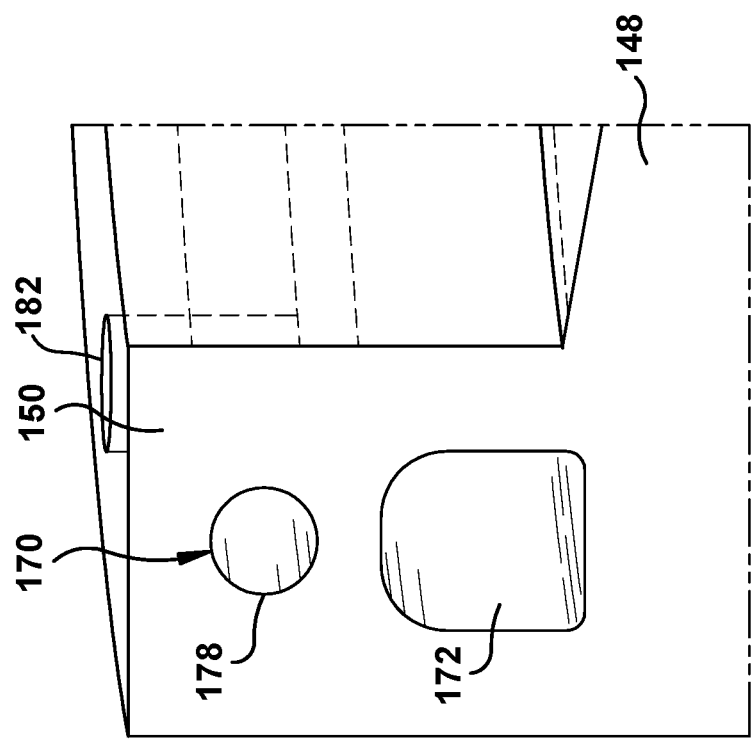
FIG. 6 shows a cross-sectional view of a tip rail along line 6-6 in FIG. 5, showing a cross-section of a passage length.

FIG. 6 shows a cross-sectional view of tip rail 150 along line 6-6 in FIG. 5, showing a cross-section of passage length 178, and FIG. 7 shows a cross-sectional view of tip rail 150 along line 7-7 in FIG. 5, showing a cross-section of a metering element 180. Metering element 180 is fluidly coupled to passage length 178, e.g., disposed at a downstream end (right side in FIG. 5) of passage length 178. As observed from FIG. 5 and by comparing FIG. 6 with FIG. 7, passage length 178 may have a first cross-sectional area and metering element 180 may have a second cross-sectional area less than the first cross-sectional area. In one embodiment, metering element 180 may simply have at least a portion thereof with a smaller diameter than passage length 178, e.g., 0.0533 centimeters (cm) (0.025 inches) compared 0.0635 cm (0.021 inches) for passage length 178. In another embodiment, passage length 178 may have a circular cross-section (FIG. 6), and metering element 180 may have an elliptical cross-section (FIG. 7). That is, metering element 180 may have a radial (vertical) height (H) greater than a circumferential (horizontal) width (W) thereof, or vice versa. In another embodiment, passage length 178 may have a square cross-section and metering element 180 may have a rectangular cross-section having a circumferential width less than that of passage length 178. Other polygonal arrangements in which metering element 180 has a smaller cross-sectional area than passage length may also be employed. In any event, as shown in FIG. 4, metering element 180 may present a face 190 facing passage length 178, which may contribute to heat transfer from the coolant flow passing therethrough. Metering element 180 being elliptical addresses heat transfer and additive manufacturing constraints. For example, current practice dictates a minimum hole size (D1) to prevent dust clogging and a separate hole size (D2) for additively manufactured holes, e.g., to prevent collapse thereof during manufacture. The minimum size for additive manufacturing is larger; however, the manufacturing limitation only applies normal to the build plane, which in this case is the radial (vertical) direction. Hence, elliptical metering element 180 in this example may be size D1 in circumferential width (W) and size D2 in radial height (H). Hence, elliptical metering element 180 in this example may be size D1 in circumferential width (W) and size D2 in radial height (H). In any event, metering element 180 acts to meter coolant flow therethrough. Metering element 180 thus has a smaller cross-sectional area than passage length 178, providing increase in heat transfer, meeting of additive manufacturing limitations, regulating the quantity of coolant flow, and satisfying backflow pressure margin requirements.

Outlet 182 (FIG. 5) is fluidly coupled to metering element 180 and extends through radially outward facing rail surface 160. Outlet 182 may have any variety of cross-sectional shape. In one embodiment shown, it has a circular cross-section. In alternative embodiments, it could be square or rectangular. Outlet 182 may be radially oriented, indicating that outlet 182 extends generally in a radial direction; it may be slightly radially angled, e.g., +/−10°. Outlet 182 provides a heat transfer benefit associated with the coolant flow that is ejected from metering element 180 impinging against an internal surface of the outlet, and provides a larger opening providing a lower risk of closing from blade tip rubs, e.g., from outward facing rail surface 160 smearing over cooling holes. Outlet 182 may have any size necessary to prevent cooling holes from closing. In one example, outlet 182 may have diameter twice that of metering element 180.

Airfoil 124, and in particular tip 137, can be manufactured using any now known or later developed process such as casting and additive manufacturing. However, it is noted that tip rail cooling passage 170 lends itself especially to additive manufacture. In this case, in contrast to conventional tips, rail 150 can be a unitary structure, i.e., one piece, with tip rail cooling passage 170 therein. Further, as best observed in FIG. 4, inlet 176, passage length 178 and metering element 180 of tip rail cooling passage 170 are within inner rail surface 157, outer rail surface 159 and radially outward facing rail surface 160 of rail 150. There is no need to create portions of the tip rail cooling passage with a cover, or close open passages with other elements. The type of additive manufacturing used can vary. In one example, the additive manufacturing may include direct metal laser melting.

As shown in FIG. 4, while one tip rail cavity 172 and one tip rail cooling passage 170 have been described herein, a plurality of pairs of the cavities and tip rail cooling passages may be spaced within rail 150. The extent to which tip rail cavity 172 and/or tip rail cooling passage 170 circumscribes or extends within rail can vary depending on any number of factors such as but not limited to: tip size, rail length, thermal conditions, coolant conditions, etc. In some cases, tip plate 148 may include a tip plate coolant passage 149 extending from a portion of airfoil chamber 174 through tip plate 148 into tip pocket 155. Tip plate coolant passage 149 may provide film cooling to tip plate 148.

Tip rail cooling passage 170 provides angled inlet 176 and large surface areas along passage length 178, and internal surface of outlet 182 to provide significant heat transfer. Metering element 180 creates a coolant flow backflow margin in tip rail cavity 172 (and further upstream) regardless of position of rail 150. The large outlet 182 reduces the likelihood that the hole closes due to tip rub, and provides another heat transfer surface in conjunction with metering element 180. Tip rail cooling passages 170 may reduce tip coolant flow compared to current arrangements, which provides an increased combined cycle efficiency for gas turbine engines. Further, passages 170 may increase part durability.

Figure 8:
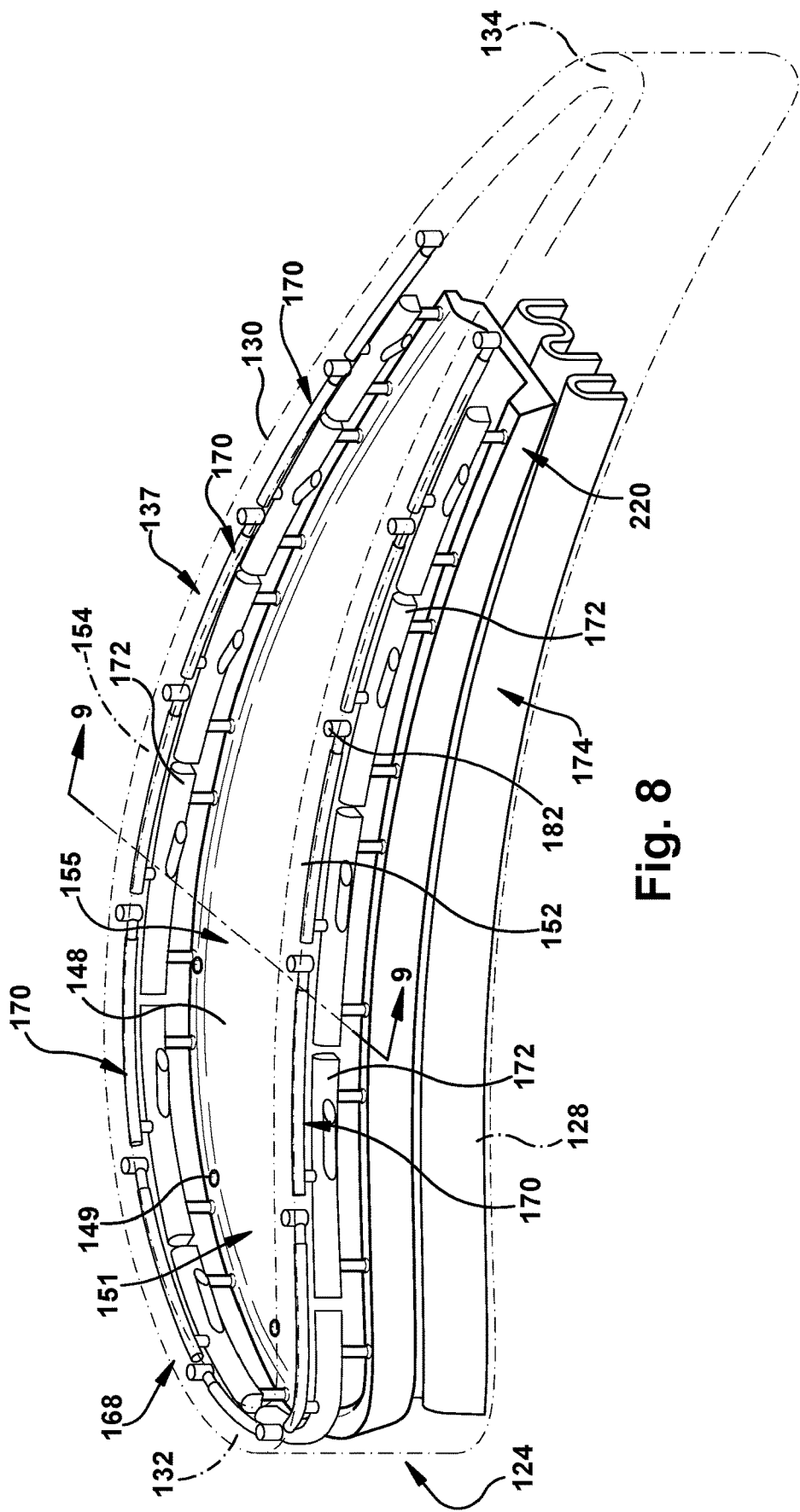
FIG. 8 shows a see-through perspective view of the tip of a turbine component in the form of a turbine rotor blade in which embodiments of the disclosure may be used.
Figure 9:
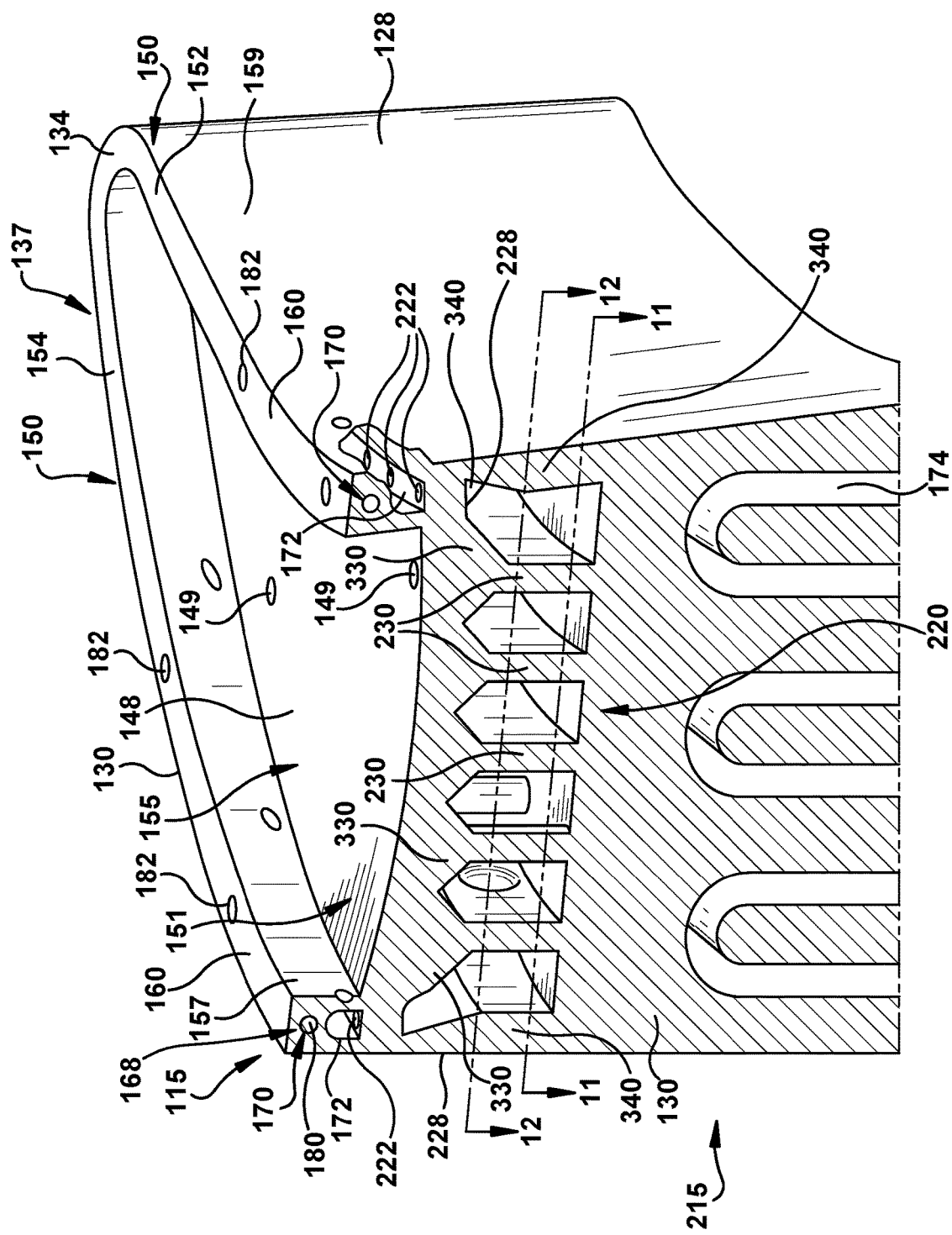
FIG. 9 shows a cross-sectional view of the tip along line 9-9 in FIG. 8, showing a cross-section of the tip and a rail coolant directing chamber according to embodiments of the disclosure.
Figure 10:
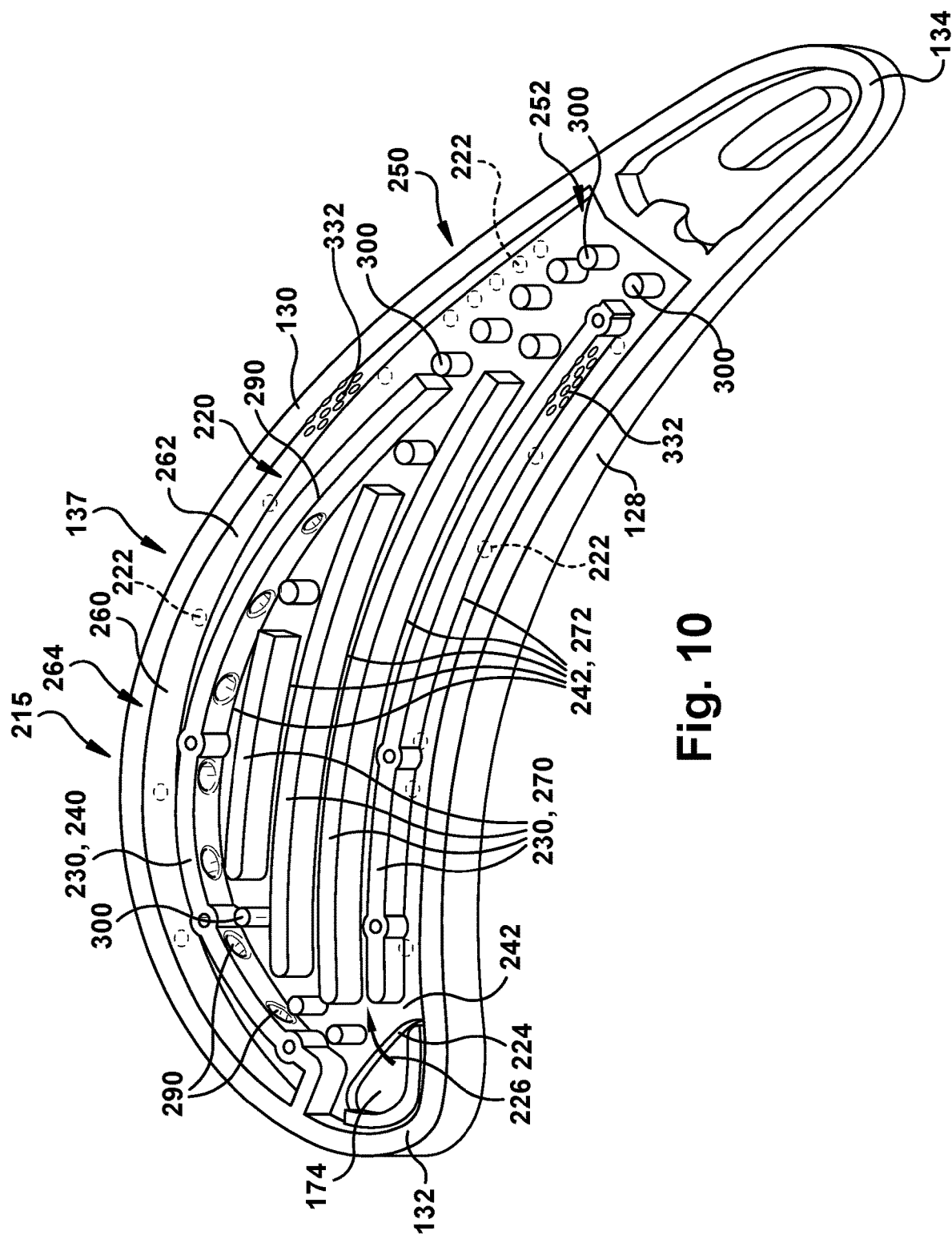
FIG. 10 shows a perspective view of a rail coolant directing chamber according to embodiments of the disclosure.

Referring to FIGS. 8-21, embodiments of turbine component, a turbine rotor blade 115 (FIG. 9 only, for clarity) with a rail coolant directing chamber 220 will now be described. FIG. 8 shows a see-through perspective view of tip 137 with rail coolant directing chamber 220, and FIG. 9 shows a cross-sectional view along line 9-9 in FIG. 8 of tip 137. In this embodiment, rather than the structure shown in FIG. 4 with just airfoil chamber 174, tip 137 may include rail coolant directing chamber 220 according to embodiments of the disclosure. FIG. 10 shows a perspective view of rail coolant directing chamber 220 according to embodiments of the disclosure. As described relative to FIG. 4, and again shown in FIG. 8, airfoil chamber 174 is disposed within airfoil 215, airfoil chamber 174 configured to supply a coolant through the airfoil, e.g., air from compressor 102 (FIG. 1). The turbine component may also include tip plate 148 at tip 137 between pressure side wall 128 and the suction side wall 130, which extends between leading 132 edge and trailing edge 134. Rail 150 extends radially from tip plate 148 and is disposed near or at a periphery of tip plate 148. Rail 150 may include at least one tip rail cooling structure 168 at least partially therein. In the FIG. 9 embodiment, tip rail cooling structure 168 includes tip rail cavity 172 and tip rail cooling passage 170 therein, and as will be described relative to the FIGS. 18 and 19 embodiments, tip rail cooling structure 168 may include just tip rail cavity 172. Each tip rail cooling structure 168 may be at least partially radially within rail 150. Rail 150 may include a pressure side wall rail 152 and a suction side wall rail 154. Rail 150 may have discontinuities in it, where desired.

Rail coolant directing chamber 220 may be radially positioned between airfoil chamber 174 and tip plate 148 within airfoil 215. Rail coolant directing chamber 220 may provide some cooling to parts of airfoil 215 upon which a coolant flow 226 therein is exposed, but also functions to direct coolant flow 226 from airfoil chamber 174 to areas in which cooler coolant flow 226 for rail 150 is desired, e.g., along pressure side wall 128 and in an aft region 250 of suction side wall 130. As will be described herein, outlets 222 of rail coolant directing chamber 220 may be in fluid communication with tip rail cooling structure 168 such as tip rail cavity(ies) 172 that feed to tip rail cooling passage(s) 170, or may be in direct fluid communication with tip rail cooling passage(s) 170—where cavities 172 are omitted, see e.g., FIG. 20.

Continuing with FIG. 10, rail coolant directing chamber 220 may include an inlet 224 fluidly coupled to airfoil chamber 174 to receive a coolant flow 226 including at least a portion of the coolant from airfoil chamber 174. Inlet 224 may pull coolant flow 226 from any desired location along airfoil chamber 174, e.g., after impingement cooling, at an uppermost swing of a cooling circuit (FIG. 9), etc. Where inlet 224 pulls coolant flow 226 from may depend on a number of factors including but not limited to: desired coolant pressure, coolant temperature, or coolant flow rate; airfoil application; anticipated rail temperatures; airfoil material; etc.

Figure 20:
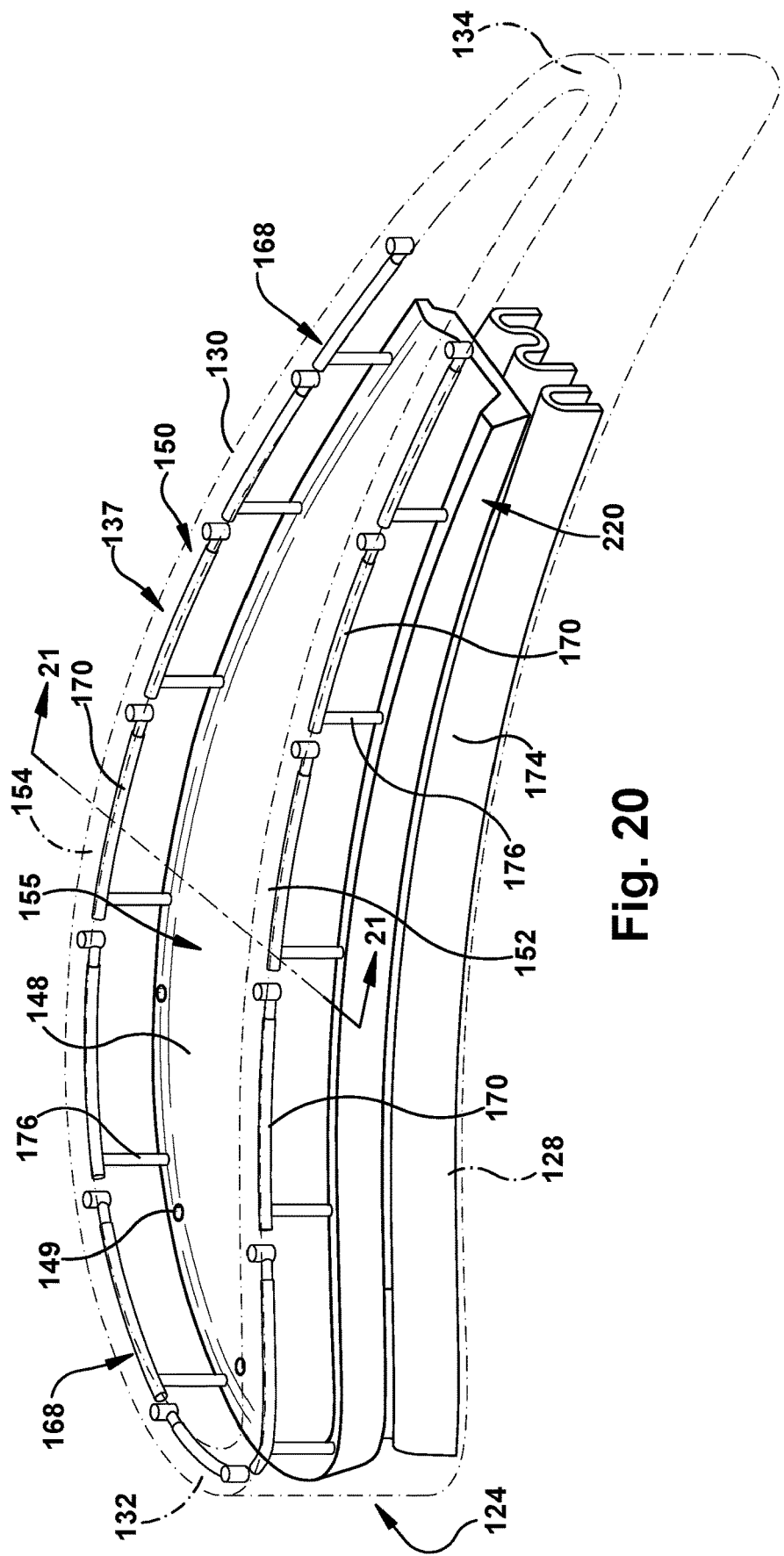
FIG. 20 shows a see-through perspective view of a tip of a turbine component in the form of a turbine rotor blade in which alternative embodiments of the disclosure may be used.
Figure 21:
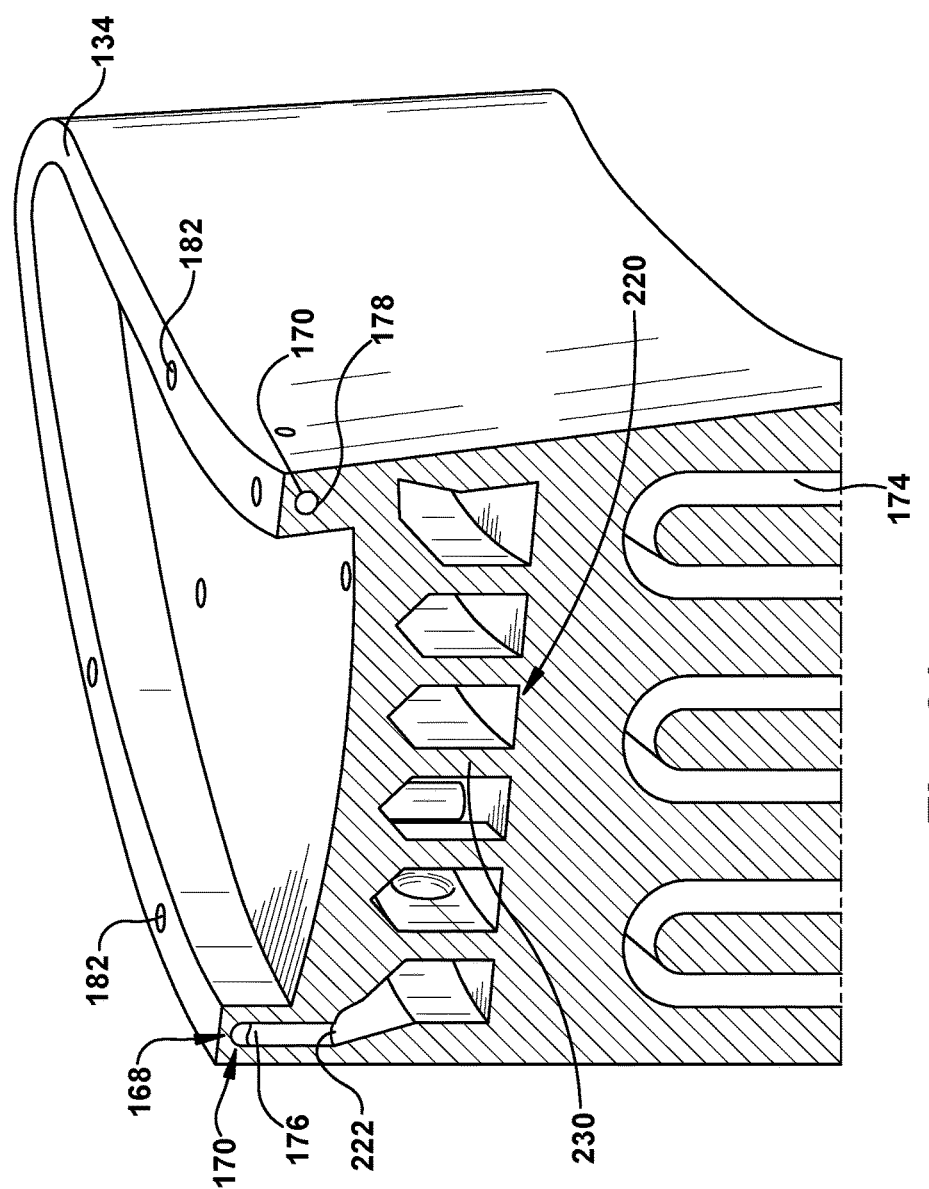
FIG. 21 shows a cross-sectional view of a tip and a rail coolant directing chamber along line 21-21 in FIG. 20 according to additional alternative embodiments of the disclosure.

A plurality of outlets 222 from rail coolant directing chamber 220 direct coolant flow 226 to at least one tip rail cooling structure 168. Tip rail cooling structure 168 may include any now known or later developed cooling feature for rail 150. In the illustrative embodiment of FIG. 9, tip rail cooling structure 168 includes tip rail cooling passage 170 according to embodiments of the disclosure in rail 150, and also includes tip rail cavity(ies) 172. In the illustrative embodiment of FIGS. 18 and 19, tip rail cooling structure 168 includes only tip rail cavity(ies) 172, which may feed to other structure such as but not limited to tip pocket 155 via openings 223. In the illustrative embodiment of FIGS. 20 and 21, tip rail cooling structure 168 includes only tip rail cooling passage(s) 170 in direct communication with rail coolant directing chamber 220. FIGS. 18-21 will be described in greater detail herein. Outlets 222 may be positioned in a radial ceiling 228 (FIG. 9) along an outer periphery of rail coolant directing chamber 220, i.e., just within pressure and suction side walls, in such a way that coolant flow 226 may enter tip rail cooling structure 168, e.g., tip rail cavity 172 (FIGS. 9, 18 and 19) or tip rail cooling passage 170 (FIGS. 20-21). Outlets 222 have been superimposed in FIG. 10 in phantom to illustrate location relative to side walls 128, 130. Any number of outlets 222 can be provided, and they can be spaced or angled as necessary to provide the desired cooling.

Rail coolant directing chamber 220 may also include at least one directing wall 230 therewithin. Directing wall(s) 230 are positioned to direct coolant flow 226 towards one or more of plurality of outlets 222 located along at least one of pressure side wall 128 and an aft region 250 of suction side wall 130 prior to other outlets, i.e., outlets that do not feed coolant flow to those areas. It has been discovered that rail 150 exhibits hotter temperatures in these areas, and as such, additional rail cooling is beneficial. As will be described, directing wall(s) 230 may take a variety of forms in accordance with embodiments of the disclosure.

Figure 11:
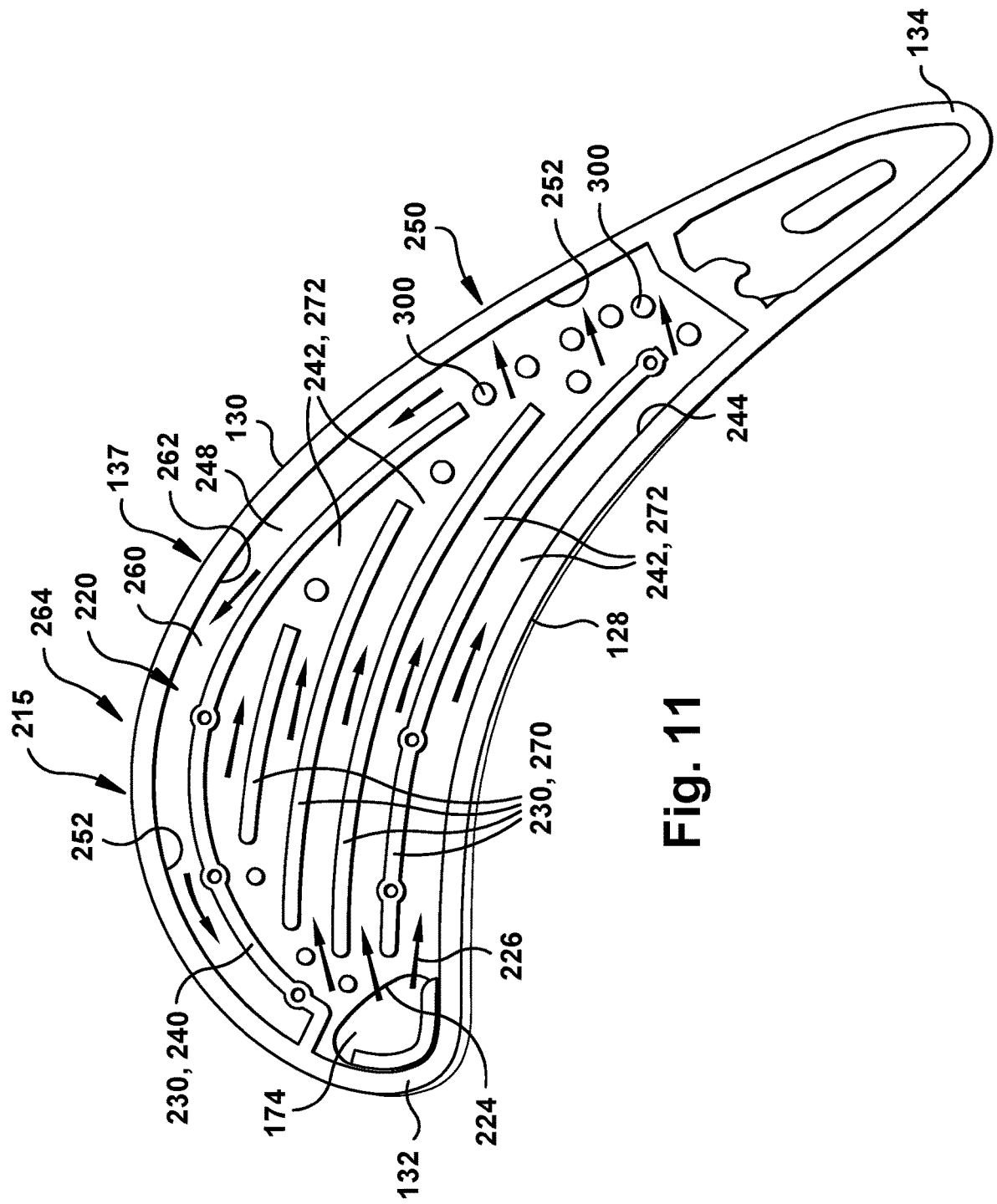
FIG. 11 shows a cross-sectional view of the tip along line 11-11 in FIG. 9, showing a first cross-section of the rail coolant directing chamber.
Figure 12:
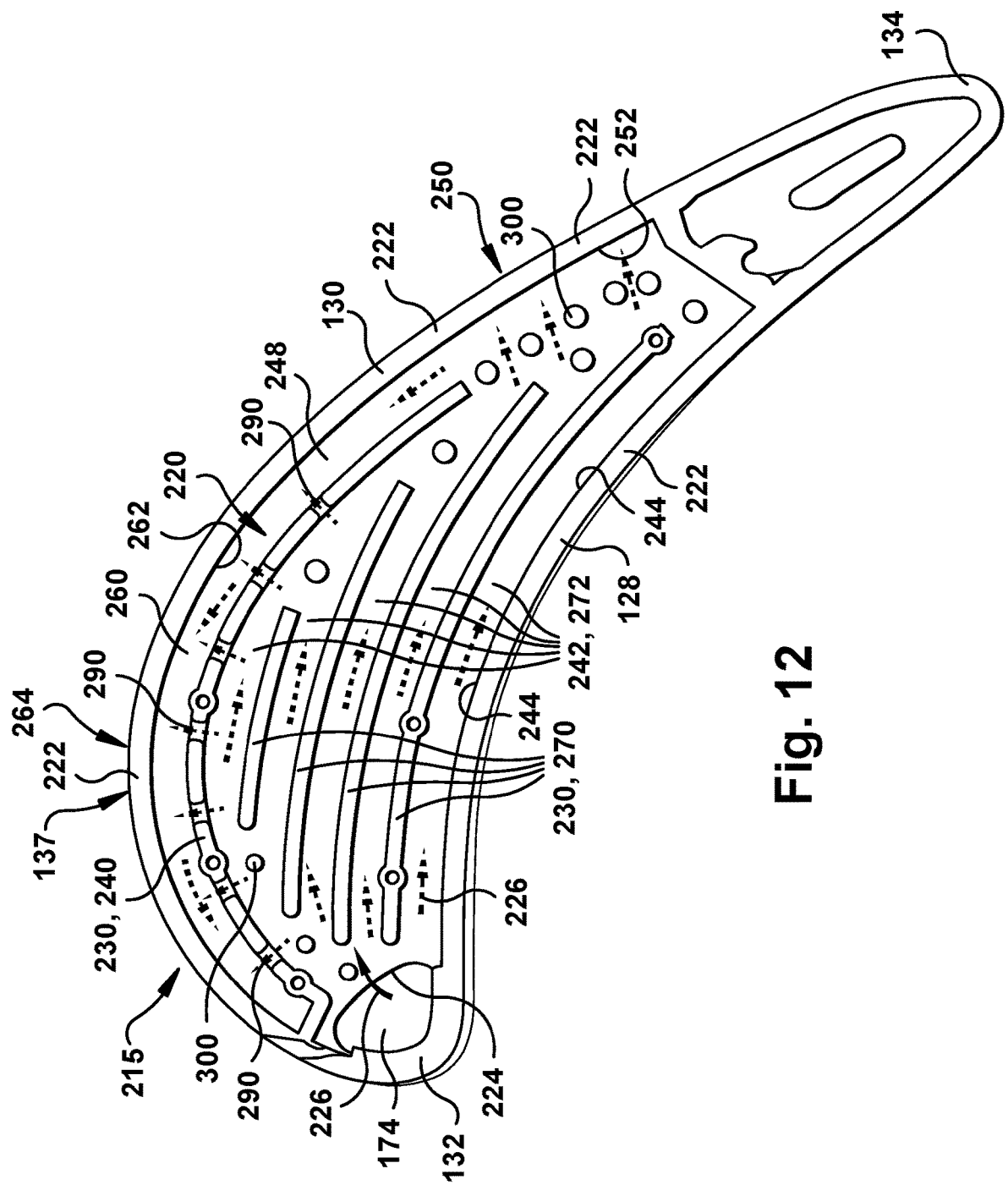
FIG. 12 shows a cross-sectional view of the tip along line 12-12 in FIG. 9, showing a second cross-section of the rail coolant directing chamber.

FIGS. 10-16 show a number of embodiments in which directing wall(s) 230 includes a separating wall 240 within rail coolant directing chamber 220. FIG. 11 shows a cross-sectional view of the tip along line 11-11 in FIG. 9, showing a first cross-section of the rail coolant directing chamber 220; and FIG. 12 shows a cross-sectional view of the tip along line 12-12 (radially outward from line 11-11) in FIG. 9, showing a second cross-section of the rail coolant directing chamber. (FIGS. 13-17 show cross-sections similar to FIG. 12.)

In the embodiments shown in FIGS. 9-16, separating wall 240 creates a passageway 242 (referred to herein as "upstream passageway") for coolant flow 226 in fluid contact with an interior surface 244 of pressure side wall 128 and aft region 250 of an interior surface 252 of suction side wall 130. Separating wall 240 also creates a passageway 260 (referred to herein as "downstream passageway") for coolant flow 226 that is in fluid contact with an interior surface 262 of suction side wall 130, e.g., at other regions thereof such as a forward region 264 upstream of aft region 250. Aft region 250 can be defined as a portion of suction side wall 130 that observes higher temperatures than forward region 264, i.e., because of its location where hot gases impact temperature more profoundly over suction side wall 130 and suction side inner rail surface 157. Forward region 264 may extend from leading edge 132 to aft region 250. As used herein, "fluid contact" indicates coolant flow 226 is in direct fluid communication with the stated surface of the particular side wall. "Interior surface" indicates the outermost, internally facing surface of the particular side wall. In FIGS. 10-16, inlet 224 opens into rail coolant directing chamber 220 adjacent leading edge 132, i.e., immediately within or near it, and opens to upstream passageway 242, but not downstream passageway 260. Coolant flow 226 enters and flows through downstream passageway 260 after having gone through upstream passageway 242.

Figure 13:
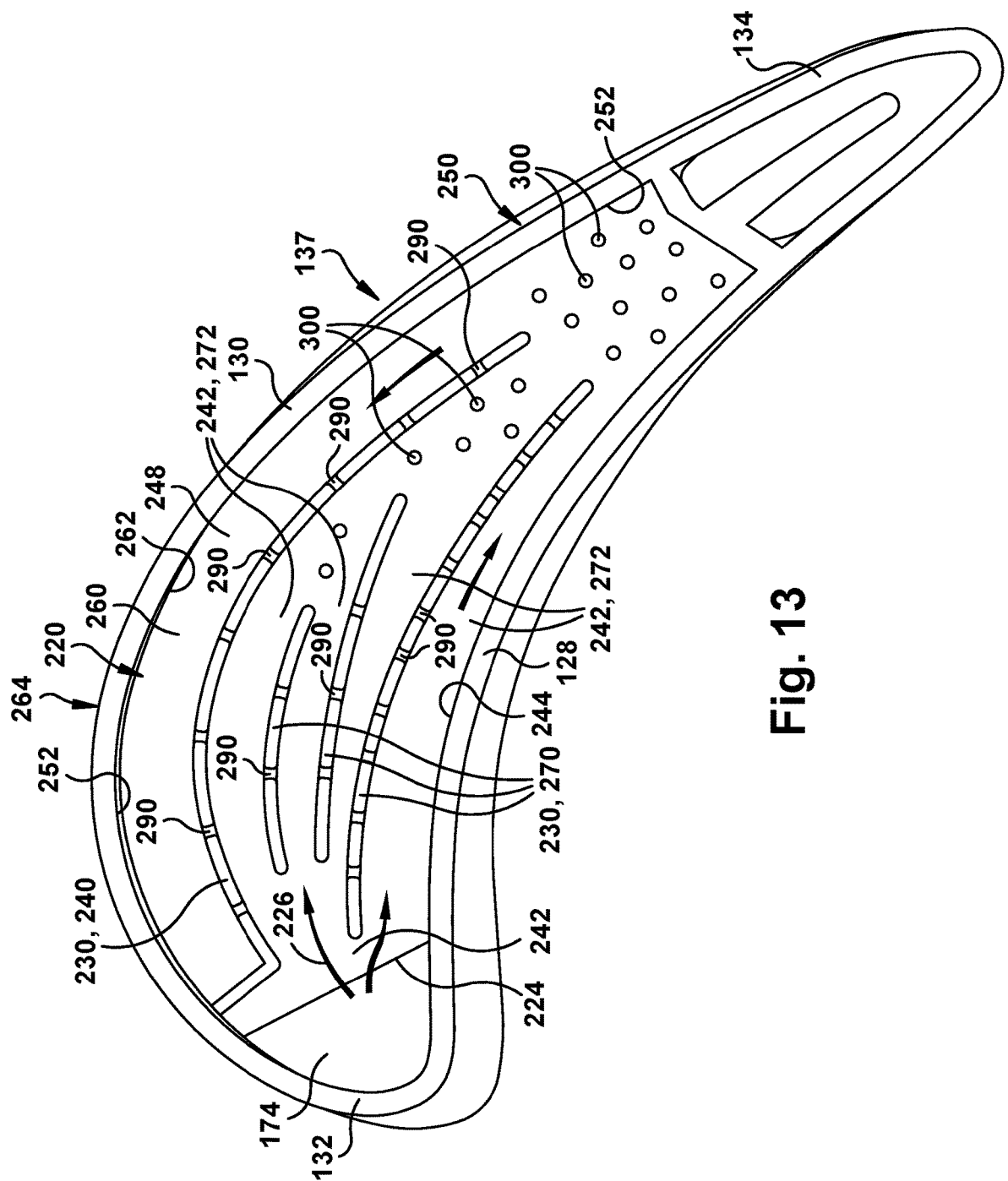
FIG. 13 shows a cross-sectional view of a rail coolant directing chamber according to another embodiment of the disclosure.
Figure 14:
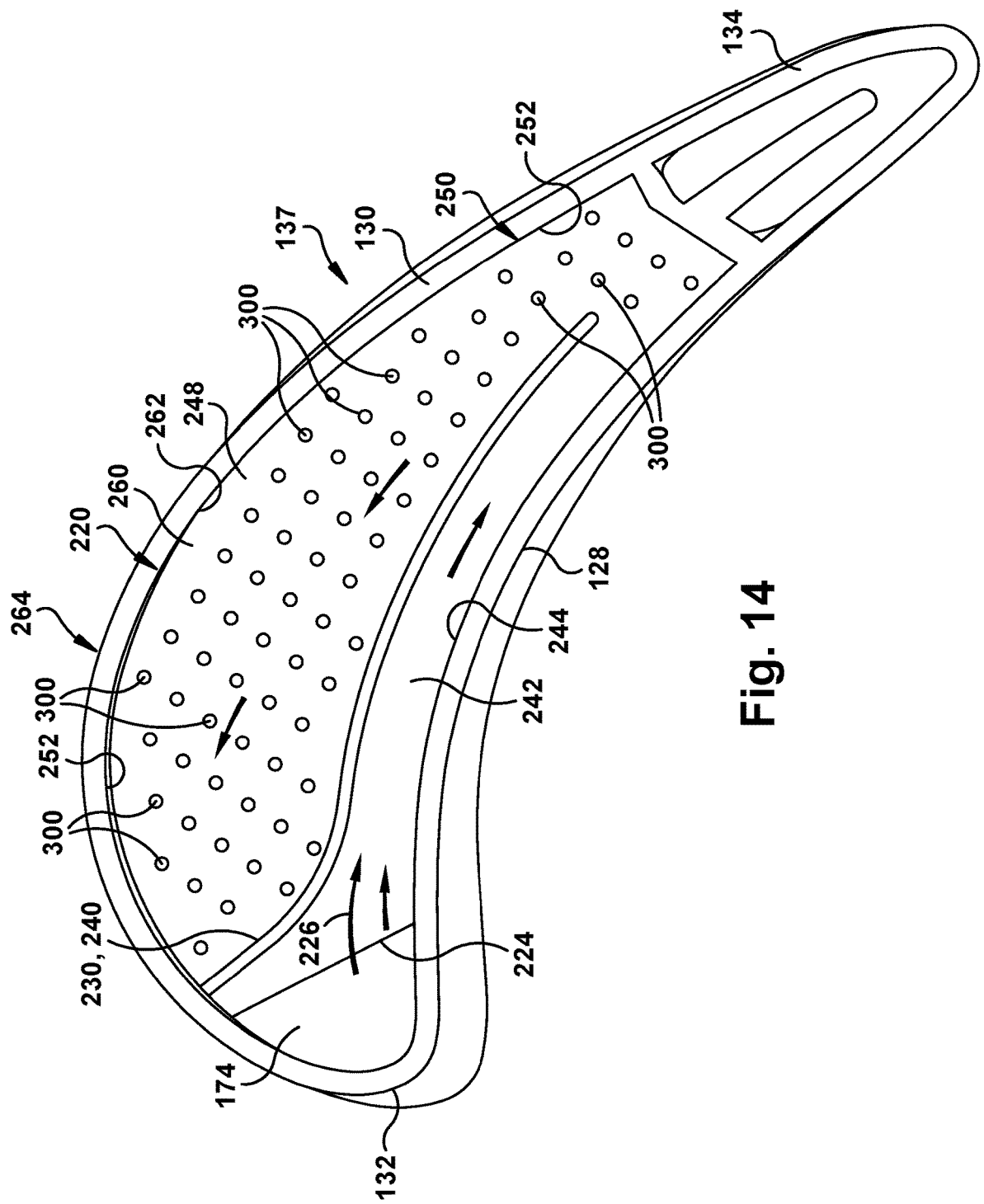
FIG. 14 shows a cross-sectional view of a rail coolant directing chamber according to another embodiment of the disclosure.

FIGS. 10-13 show directing wall(s) 230 including at least one coolant directing wall 270 segregating upstream passageway 242 into a plurality of separate passageways 272. Directing wall(s) 270 and separate passageways 272 may be employed, for example, to spread coolant flow 226 evenly through rail coolant directing chamber 220 to, for example, provide some cooling to the walls and chamber, direct coolant flow 226 as needed, more evenly distribute coolant flow 226 and provide support for tip plate 148 during manufacture and beyond. The spacing between walls 270 can be defined on any number of factors such as but not limited to desired flow parameters and the strength necessary to support tip plate 148. In FIGS. 10-12, four coolant directing walls 270 are shown, and in FIG. 13, three coolant directing walls 270 are shown. However, it is emphasized that any number of coolant directing walls 270 may be employed. In contrast, FIG. 14 provides only separating wall 240 with discrete supports 300 in downstream passageway 260 and near after region 250.

Figure 15:
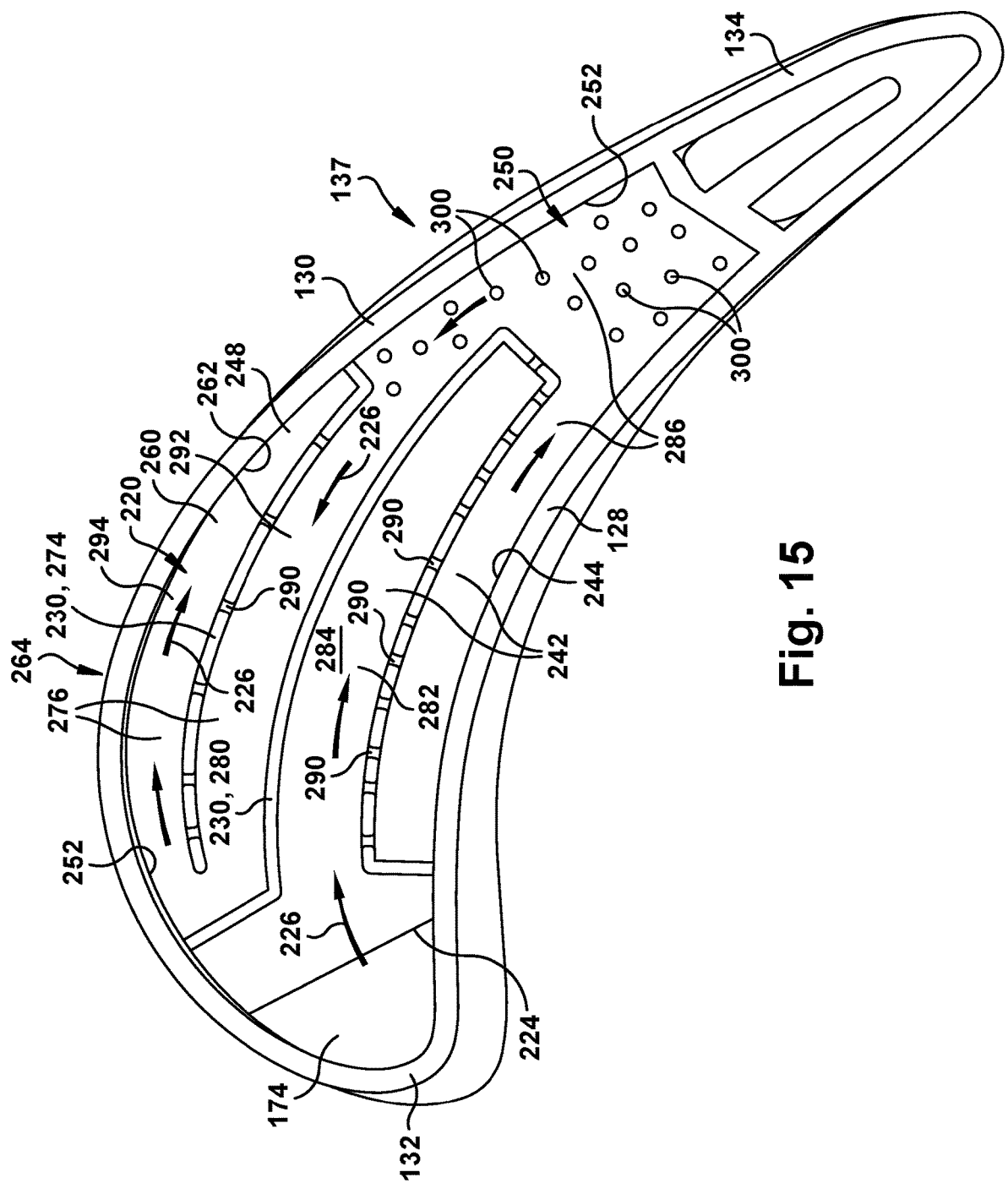
FIG. 15 shows a cross-sectional view of a rail coolant directing chamber according to another embodiment of the disclosure.
Figure 16:
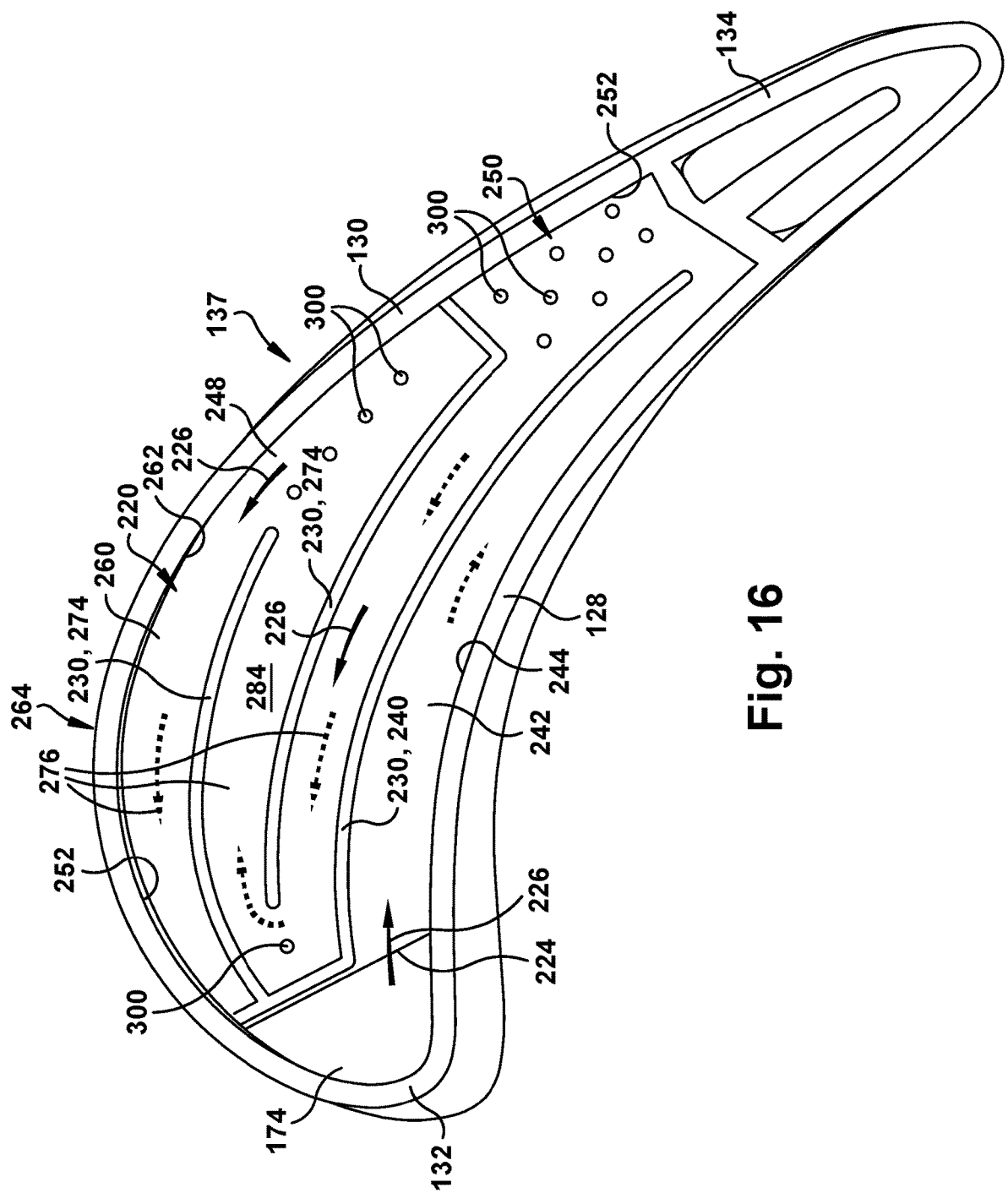
FIG. 16 shows a cross-sectional view of a rail coolant directing chamber according to another embodiment of the disclosure.

As shown in FIGS. 15 and 16, directing wall(s) 230 may also include at least one coolant directing wall 274 segregating downstream passageway 260 into a plurality of separate passageways 276. Coolant directing wall(s) 274 and separate passageways 276 may be employed for similar reasons as those stated above for coolant directing wall(s) 270 and passageways 272. Further, coolant directing wall(s) 274 may direct coolant flow 226 in different upstream and downstream directions relative to forward region 264 of suction side wall 130. For example, as shown in FIGS. 15 and 16, one or two coolant directing wall(s) 274, respectively, may be used to expose a center portion 284 of rail coolant directing chamber 220 to coolant flow 226 prior to exposing forward region 264. In FIG. 15, one coolant directing wall 274 acts to direct coolant flow 226 downstream along forward region 264 of suction side wall 130, while in FIG. 16, two coolant directing walls 274 act to direct coolant flow 226 upstream along forward region 264. Any number of coolant directing walls 274 may be employed to, for example, spread coolant flow 226 evenly through rail coolant directing chamber 220 to, for example, provide some cooling to the walls and chamber, direct coolant flow 226 as needed, more evenly distribute coolant flow 226 and provide support for tip plate 148 during additive manufacture and beyond. The spacing between coolant directing walls 274 can be defined on any number of factors such as but not limited to desired flow parameters and the strength necessary to support tip plate 148.

With further reference to FIG. 15, directing wall(s) 230 may include a channel separating wall 280 within rail coolant directing chamber 220. Channel separating wall 280 creates upstream passageway 242 via a channeled passageway 282 into a center portion 284 of rail coolant directing chamber 220 and a subsequent passageway 286 in fluid contact with interior surface 244 of pressure side wall 128 and leading to aft region 250 of interior surface 252 of suction side wall 130. A plurality of crossover openings 290 may be provided facing pressure side wall 128 in channel separating wall 280 for directing coolant flow 226 therethrough. A coolant directing wall 274 may extend forward from aft region 250 of interior surface 252 of suction side wall 130. Coolant directing wall 274 creates a separate passageway 292 extending from aft region 250 of interior surface 252 of suction side wall 130 upstream toward leading edge 132 and a contiguous passageway 294 extending downstream along forward region 264 of interior surface 252 of suction side wall 130.

As shown best in FIGS. 10, 12, 13, 15 and 17, at least one directing wall 230, e.g., separating wall 240 and/or coolant directing walls 270, 274 may include a plurality of crossover openings 290 therein allowing a portion of coolant flow 226 to pass through the respective wall. Crossover openings 290 thus allow more control over coolant flow 226 direction and flow volume. Crossover openings 290 can be spaced in any manner, e.g., uniform or non-uniform within each wall, and may have any desired size or shape.

Discrete supports 300 can be provided within rail coolant directing chamber 220 in any location necessary to provide support to tip plate 148, e.g., during additive manufacture and beyond. Each discrete support 300 can take any vertical form to, for example, provide desired, local heat transfer and/or support tip plate 148 thereover, e.g., a post of any cross-section, a lattice structure, etc. Discrete supports 300 may be positioned practically anywhere in rail coolant directing chamber 220. For example, with reference to FIG. 16, a plurality of discrete supports 300 may be positioned within at least downstream passageway 260. However, in other embodiments, plurality of discrete supports 300 may be positioned in a variety of locations. Again, FIG. 14 provides only separating wall 240 with discrete supports 300 in downstream passageway 260 and near after region 250. Any number of discrete supports 300 may be provided and they may be distributed in any manner necessary.

Figure 17:
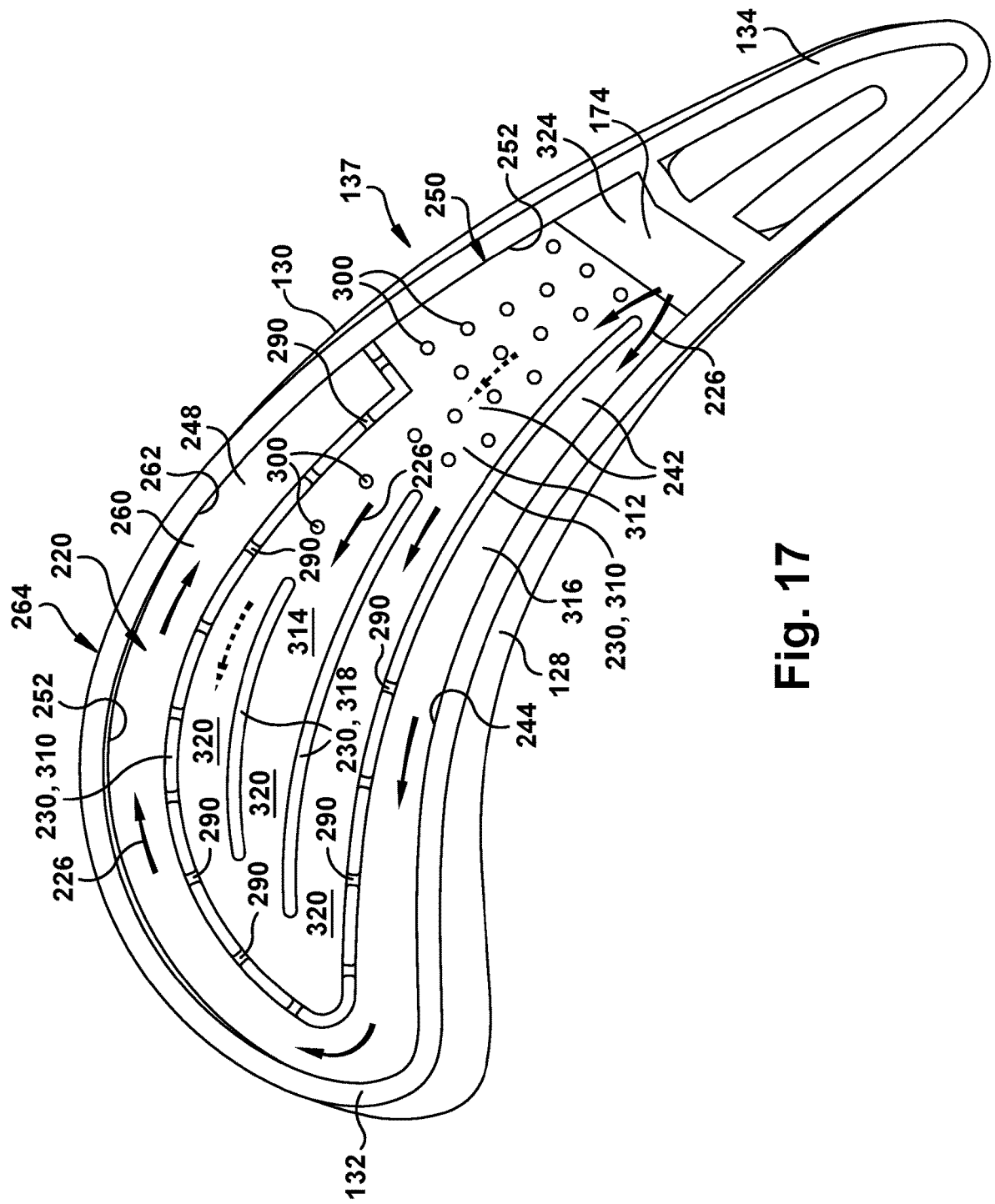
FIG. 17 shows a cross-sectional view of a rail coolant directing chamber according to another embodiment of the disclosure.

With reference to FIG. 17, in other embodiments, inlet 324 may open to rail coolant directing chamber 220 adjacent to aft region 250 of interior surface 252 of suction side wall 130. It is also noted that inlet 224 may be positioned at practically any location within rail coolant directing chamber 220 with directing wall(s) 230 directing coolant flow 226 to pressure side wall 128 and aft region 250 of interior surface 252 of suction side wall 130 prior to other regions such that outlets 222 (e.g., FIG. 9) therein receive coolant flow 226 before other outlets. In FIG. 17, directing wall(s) 230 may include a channel separating wall 310 within rail coolant directing chamber 220, creating upstream passageway 242 including a passageway 312 into a center portion 314 of rail coolant directing chamber 220 and another passageway 316 in contact with interior surface 244 of pressure side wall 128 and leading to forward region 264 of interior surface 252 of suction side wall 130. Channel separating wall 310 may include plurality of crossover openings 290 within the wall for directing coolant flow 226 therethrough. Coolant directing wall(s) 318 may also be provided to segregate passageway 312 into a plurality of separate passageways 320. Each of separate passageways 320 may feed to passageway 316 via crossover openings 290.

Returning to FIG. 9, a cross-section illustrates directing wall(s) 230 within rail coolant directing chamber 220 creating two or more passageways. As shown, for additive manufacturing purposes, the passageway(s) may include a peaked ceiling 330 within tip plate 148, to support the squealer floor. As understood, peaked ceilings allow sufficient support of ceilings during additive manufacture to prevent collapses of an overly horizontal surface. It is also observed that outermost directing walls 340 may angle outward near bottom of tip plate 148 for support or to provide coolant access to outlets 222. Discrete supports 300 may have similar flared upper ends to allow for additive manufacture. FIG. 9 also illustrates that, where additively manufactured, tip plate 148, rail 150, and directing wall(s) 230 form a unitary structure, i.e., they are one integral piece of material. FIG. 9 also shows that where rail coolant directing chamber 220 is provided, tip plate coolant passage(s) 149 may extend from rail coolant directing chamber 220 through tip plate 148, rather than airfoil chamber 174 in other embodiments.

As shown in an example in FIG. 10, any of directing wall(s) 230, pressure side wall 128 and/or suction side wall 130 may include any now known or later developed turbulating element(s) 332 thereon, i.e., on an interior surface thereof, to create a turbulent flow in coolant flow 226 to increase heat transfer. Turbulating elements 332 may include but are not limited to: vortex generators, dimples, waves, roughness, etc., and may be positioned anywhere a turbulent flow is desired.

Returning to FIGS. 11 and 12, in operation and as shown by arrows, coolant flow 226 enters rail coolant directing chamber 220 via inlet 224 and enters upstream passageway 242. In the embodiments illustrated in FIGS. 11 and 12, upstream passageway 242 includes a number of directing walls 270 that segregate the passageway, and distribute coolant flow. As coolant flow 226 first moves along interior surface 244 of pressure side wall 128, it encounters outlets 222 to tip rail cooling structure 168 (e.g., FIG. 10) of rail 150, thus directing cooler coolant flow 226 thereto prior to other outlets 222, e.g., in forward region 264 of suction side wall 130. Most of coolant flow 226 is cordoned off from interior surface 262 of forward region 264 of suction side wall 130 and outlets 222 thereabove by separating wall 240. As shown in FIG. 12, in some embodiments, some limited amount of coolant flow 226 may pass through crossover openings 290 to forward region 264. The portion of coolant flow 226 that passes through crossover openings 290 cools the coolant flow therein, but is still hotter than the majority of coolant flow 226 in upstream passageway 242. The cooler portion of coolant flow 226 in upstream passageway 242, after encountering outlets 222 along pressure side wall 128, next encounters outlets 222 in aft region 250 of interior surface 252 of suction side wall 130. In this fashion, rail 150 over aft region 250 of suction side wall also receives cooler coolant flow than other outlets, e.g., those in forward region 264. After aft region 250, coolant flow 226 enters downstream passageway 260 where it encounters outlets 222 in forward region 264 and passes to tip rail cooling structure 168 (e.g., FIG. 10) of rail 150. As noted, some of cooler coolant flow 226 may pass through crossover openings 290 to mix with this now hotter coolant flow 226 in downstream passageway 260.

Other embodiments operate in a similar fashion to FIGS. 11 and 12. Coolant flow 226 passes through upstream passageway 242 first, where it exits outlets 222 to tip rail cooling structure 168 (FIGS. 9, 19 and 21) of rail 150 near interior surface 244 of pressure side wall 128 and aft region 250 of interior surface 252 of suction side wall 130 prior to other outlets 222. FIG. 13 provides additional crossover openings 290 in directing walls 270 therein. FIG. 14 provides only separating wall 240 with discrete supports 300 in downstream passageway 260 and near after region 250. FIG. 15 provides channel separating wall 280 and directing wall 274 to create a serpentine path in rail coolant directing chamber 220 and a downstream coolant flow along forward region 264 of suction side wall 130. FIG. 16 includes a number of directing walls 274 to create a longer serpentine path through rail coolant directing chamber 220. FIG. 17 has inlet 324 near aft region 250 and a curved channel separating wall 310. Each embodiment provides unique directing walls 230 and passageways 260, 272, which although shown in discrete forms within each embodiment, may be used across different embodiments.

Figure 18:
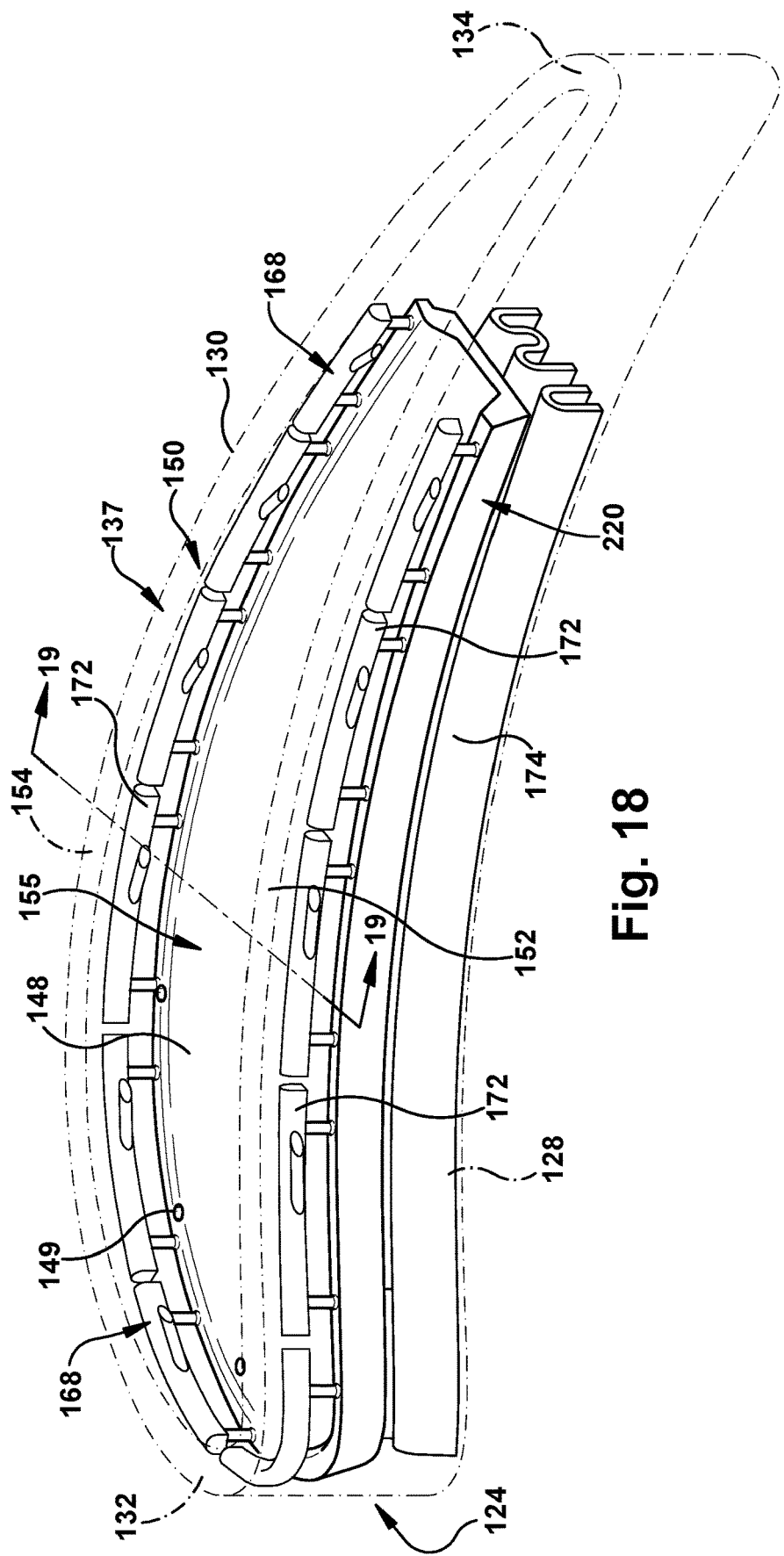
FIG. 18 shows a see-through perspective view of a tip of a turbine component in the form of a turbine rotor blade in which alternative embodiments of the disclosure may be used.
Figure 19:
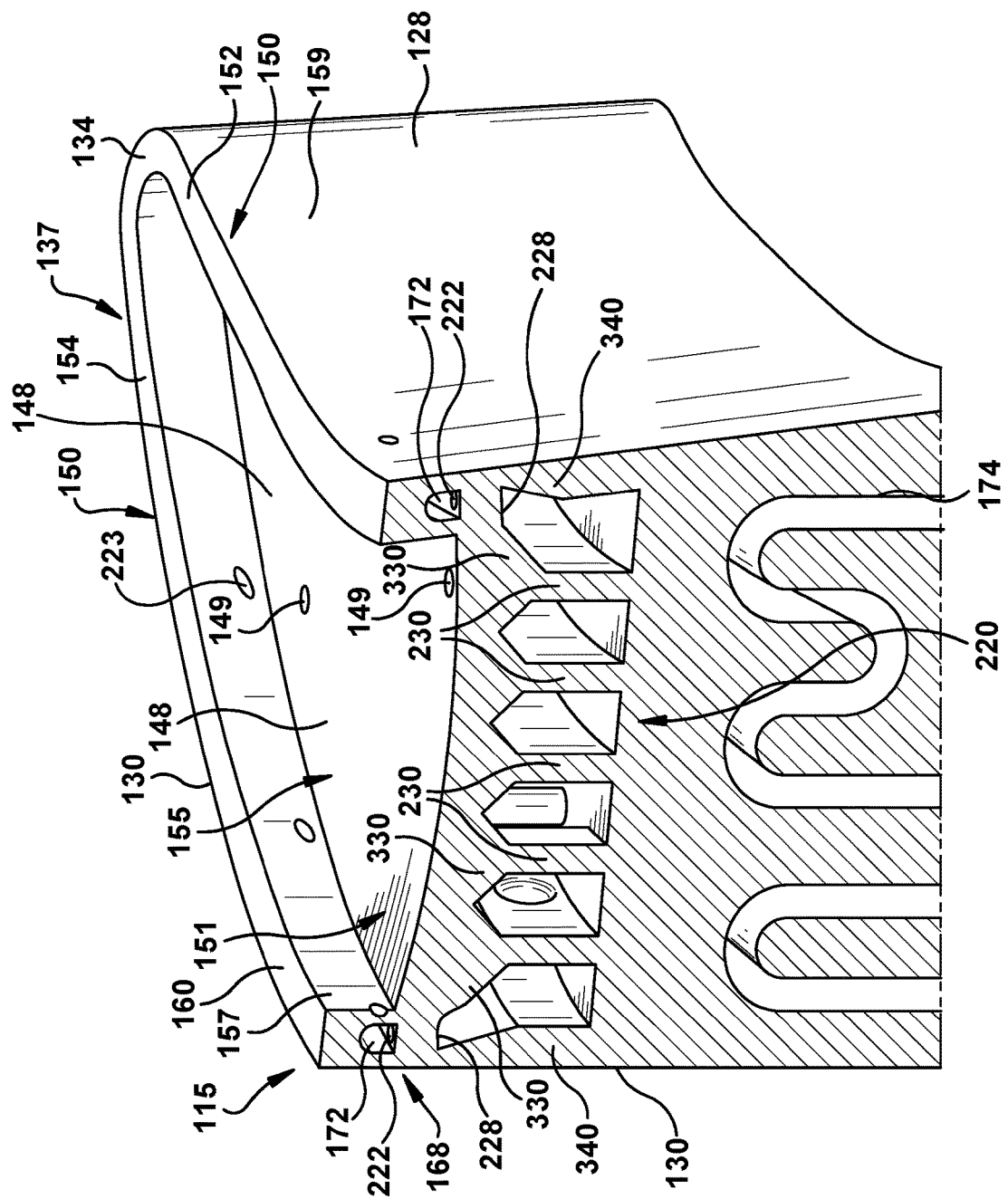
FIG. 19 shows a cross-sectional view of a tip and a rail coolant directing chamber along line 19-19 in FIG. 18 according to alternative embodiments of the disclosure.

FIGS. 18 and 19 show a see-through perspective view and a partial cross-section (similar to FIG. 9), respectively, of tip rail cooling structure 168 including only tip rail cavity(ies) 172. Here, tip rail cavities 172 may feed to other structure such as but not limited to tip pocket 155 via openings 223. Tip rail cooling passage 170 is omitted. FIGS. 20 and 21 show a see-through perspective view and a partial cross-section (similar to FIG. 9), respectively, of tip rail cooling structure 168 including only tip rail cooling passage(s) 170 in direct communication with rail coolant directing chamber 220. Here, outlets 222 of rail coolant directing chamber 220 enter inlet 176 of tip rail cooling passage 170. As illustrated, embodiments of tip rail cooling passage 170 and rail coolant directing chamber 220 can be used separately or together.

Embodiments of rail coolant directing chamber 220 provides effective cooling of rail 150 of blade squealer tips in gas turbine engines. Rail coolant directing chamber 220 provides a low pressure drop, serpentine-type internal cooling arrangement, where the coldest coolant flow 226 is first directed to outlets 222 (FIG. 10) for rail 150 in interior surface 244 of pressure side wall 128 and aft region 250 of interior surface 252 of suction side wall 130, where it is needed most. In contrast to regions of airfoil chamber 174 that may include exit openings through side walls 128, 130, pressure side wall 128 and suction side wall 130 may be devoid of coolant passage openings therethrough, i.e., chamber 220 acts to direct coolant and cool internally only. Furthermore, rail coolant directing chamber 220 incorporates features that are used to support tip plate 148 during additive manufacturing, such as directing walls 230 that are densely spaced as well as walls and discrete supports 300 that angle outward near bottom of tip plate 148.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbine component, comprising:
    an airfoil having: a base, a tip disposed opposite the base, and a pressure sidewall and a suction sidewall extending between a leading edge and a trailing edge thereof;
    an airfoil chamber disposed within the airfoil, the airfoil chamber configured to supply a coolant through the airfoil;
    a tip plate at the tip and a rail extending radially from the tip plate, the rail disposed near or at a periphery of the tip plate, the rail including an inner rail surface, an outer rail surface and a radially outward facing rail surface between the inner rail surface and the outer rail surface;
    a tip rail cavity within and partially circumscribing the rail, the tip rail cavity receiving a coolant flow; and
    a tip rail cooling passage including an inlet fluidly coupled to the tip rail cavity, a passage length fluidly coupled to the inlet and partially circumscribing the rail, a metering element fluidly coupled to the passage length, and an outlet body fluidly coupled to the metering element and extending through the radially outward facing rail surface.

2. The turbine component of claim 1, wherein the inlet is angled to direct the coolant flow in a direction opposite that of the passage length, creating a pressure loss in the coolant flow.

3. The turbine component of claim 1, wherein the passage length has a first cross-sectional area, and the metering element has a second cross-sectional area less than the first cross-sectional area.

4. The turbine component of claim 1, wherein the metering element has a radial height greater than a circumferential width thereof.

5. The turbine component of claim 1, wherein the passage length has a circular cross-section, and the metering element has an elliptical cross-section.

6. The turbine component of claim 1, wherein the outlet body has a circular cross-section.

7. The turbine component of claim 1, wherein the outlet body has a larger cross-sectional area than the metering element and the passage length.

8. The turbine component of claim 1, wherein the airfoil is additively manufactured.

9. The turbine component of claim 1, wherein the rail is a unitary structure, and the inlet, the passage length and the metering element of the tip rail cooling passage are within the inner rail surface, the outer rail surface and the radially outward facing rail surface of the rail.

10. The turbine component of claim 1, further comprising a plurality of pairs of the cavities and tip rail cooling passages spaced within the rail.

11. The turbine component of claim 1, wherein the passage length runs parallel to a portion of the radially outward facing rail surface.

12. The turbine component of claim 1, wherein the metering element is disposed at a downstream end of the passage length.

13. The turbine component of claim 1, further comprising a tip plate coolant passage extending from a portion of the airfoil chamber through the tip plate into a tip rail pocket defined within the inner rail surface.

14. A turbine rotor blade for a gas turbine engine, the turbine rotor blade comprising:
    an airfoil having: a base, a tip disposed opposite the base, and a pressure sidewall and a suction sidewall extending between a leading edge and a trailing edge thereof;
    an airfoil chamber disposed within the airfoil, the airfoil chamber configured to supply a coolant through the airfoil;
    a tip plate at the tip and a rail extending radially from the tip plate, the rail disposed near or at a periphery of the tip plate, the rail including an inner rail surface, an outer rail surface and a radially outward facing rail surface between the inner rail surface and the outer rail surface;

a tip rail cavity within and partially circumscribing the rail, the tip rail cavity receiving a coolant flow; and a tip rail cooling passage including an inlet fluidly coupled to the tip rail cavity, a passage length fluidly coupled to the inlet and partially circumscribing the rail, a metering element fluidly coupled to the passage length, and an outlet body fluidly coupled to the metering element and extending through the radially outward facing rail surface.

15. The turbine rotor blade of claim 14, wherein the inlet is angled to direct the coolant flow in a direction opposite that of the passage length, creating a pressure loss in the coolant flow.

16. The turbine rotor blade of claim 14, wherein the passage length has a first cross-sectional area, and the metering element has a second cross-sectional area less than the first cross-sectional area.

17. The turbine rotor blade of claim 16, wherein the passage length and the outlet body have a circular cross-section, and the metering element has an elliptical cross-section.

18. The turbine rotor blade of claim 14, wherein the outlet body has a larger cross-sectional area than the metering element and the passage length.

19. The turbine rotor blade of claim 14, wherein the passage length runs parallel to a portion of the radially outward facing rail surface.

20. The turbine rotor blade of claim 14, wherein the metering element is disposed at a downstream end of the passage length.

* * * * *